(12) United States Patent
Hollinger

(10) Patent No.: US 12,225,427 B2
(45) Date of Patent: Feb. 11, 2025

(54) TRACKING PROXIMITIES OF DEVICES AND/OR OBJECTS

(71) Applicant: Roku, Inc., San Jose, CA (US)

(72) Inventor: Joseph Hollinger, San Jose, CA (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 18/391,508

(22) Filed: Dec. 20, 2023

(65) Prior Publication Data

US 2024/0244394 A1 Jul. 18, 2024

Related U.S. Application Data

(63) Continuation of application No. 17/880,293, filed on Aug. 3, 2022, now Pat. No. 11,997,562, which is a
(Continued)

(51) Int. Cl.
*H04W 4/021* (2018.01)
*H04W 4/02* (2018.01)
(Continued)

(52) U.S. Cl.
CPC .......... *H04W 4/022* (2013.01); *H04W 4/029* (2018.02); *H04W 4/80* (2018.02); *H04W 68/005* (2013.01);
(Continued)

(58) Field of Classification Search
CPC ........ H04W 4/80; H04W 4/023; H04W 4/02; H04W 4/021; G08B 21/0277;
(Continued)

(56) References Cited

U.S. PATENT DOCUMENTS 8,816,845 B2 * 8/2014 Hoover ................ B60N 2/0025
340/539.11
9,953,190 B2 * 4/2018 Gill ..................... G08B 13/1427
(Continued)

FOREIGN PATENT DOCUMENTS

CN 106067243 A 11/2016
EP 1986457 A1 10/2008
(Continued)

OTHER PUBLICATIONS

Partial Supplementary European Search Report, for European Patent App. No. 18873404.0, mailed Jul. 27, 2021, 10 pages.
(Continued)

*Primary Examiner* — Dung Hong
(74) *Attorney, Agent, or Firm* — Sterne, Kessler, Goldstein & Fox P.L.L.C.

(57) ABSTRACT

Disclosed herein are system, apparatus, article of manufacture, method, and/or computer program product embodiments for tracking proximities of devices and/or objects. In one embodiment, the system operates by determining whether a plurality of devices of a tethered segment are inside or outside a predefined area. The system also operates by determining that a first device of the plurality of devices is outside of the predefined area based at least partially on the determination of whether the plurality of devices are inside or outside the predefined area. The system further operates by transmitting at least one alert notification to at least one device based at least partially on the determination that the first device is outside the predefined area, wherein the alert notification identifies the first device outside the predefined area.

20 Claims, 14 Drawing Sheets

Related U.S. Application Data continuation of application No. 17/156,937, filed on Jan. 25, 2021, now Pat. No. 11,412,346, which is a continuation of application No. 16/712,738, filed on Dec. 12, 2019, now Pat. No. 10,939,234, which is a continuation of application No. 16/281,901, filed on Feb. 21, 2019, now Pat. No. 10,524,090, which is a continuation of application No. 15/802,719, filed on Nov. 3, 2017, now Pat. No. 10,237,686.

(51) Int. Cl.
*H04W 4/029* (2018.01)
*H04W 4/12* (2009.01)
*H04W 4/80* (2018.01)
*H04W 68/00* (2009.01)
*H04W 76/15* (2018.01)

(52) U.S. Cl.
CPC ............ *H04W 4/025* (2013.01); *H04W 4/026* (2013.01); *H04W 4/12* (2013.01); *H04W 76/15* (2018.02)

(58) Field of Classification Search
CPC .......................... G08B 21/24; G08B 13/2417; G08B 21/0272; G08B 21/0225
See application file for complete search history.

(56) References Cited

U.S. PATENT DOCUMENTS

| | | | |
|---|---|---|---|
| 10,237,686 B1 | 3/2019 | Hollinger | |
| 10,524,090 B2 | 12/2019 | Hollinger | |
| 10,848,712 B1 | 11/2020 | Rao et al. | |
| 11,412,346 B2 | 8/2022 | Hollinger | |
| 2003/0063003 A1* | 4/2003 | Bero | G08B 21/0247 340/573.4 |
| 2006/0023626 A1* | 2/2006 | Krausz | G08B 21/0266 370/220 |
| 2006/0290480 A1* | 12/2006 | Funk | G08B 13/1427 340/426.2 |
| 2009/0182931 A1* | 7/2009 | Gill | G06F 21/62 711/E12.001 |
| 2010/0039266 A1* | 2/2010 | Faris | G08B 21/24 340/572.4 |
| 2011/0148625 A1* | 6/2011 | Velusamy | H04W 4/029 340/539.13 |
| 2012/0223834 A1* | 9/2012 | Hyatt | G08B 21/0247 340/539.13 |
| 2012/0286965 A1* | 11/2012 | Rautiainen | H04M 1/72454 340/670 |
| 2014/0171075 A1 | 6/2014 | Teller | |
| 2015/0078574 A1* | 3/2015 | Shin | H04R 1/1091 381/74 |
| 2015/0102924 A1* | 4/2015 | Soloway | G08B 25/008 340/539.11 |
| 2015/0156567 A1* | 6/2015 | Oliver | G08B 21/0227 340/870.07 |
| 2015/0271639 A1 | 9/2015 | Ziskinti et al. | |
| 2015/0281985 A1* | 10/2015 | Cavallaro | H04W 24/08 455/41.2 |
| 2015/0350410 A1* | 12/2015 | Weiss | H04M 1/72457 455/418 |
| 2015/0356861 A1* | 12/2015 | Daoura | G08B 21/0277 340/539.13 |
| 2016/0019765 A1 | 1/2016 | Stokes | |
| 2016/0035213 A1 | 2/2016 | Choi | |
| 2016/0036965 A1 | 2/2016 | Kim | |
| 2016/0044451 A1* | 2/2016 | Marth | H04W 4/029 340/8.1 |
| 2016/0071392 A1 | 3/2016 | Hankey et al. | |
| 2016/0098081 A1 | 4/2016 | Takahashi et al. | |
| 2016/0335876 A1* | 11/2016 | Verma | G01S 11/06 |
| 2017/0150305 A1* | 5/2017 | Chaudhri | H04M 1/72412 |
| 2017/0265075 A1 | 9/2017 | Sun | |
| 2018/0059251 A1* | 3/2018 | Elliott | G01S 19/09 |
| 2018/0075721 A1* | 3/2018 | Oliver | G08B 21/24 |
| 2022/0408216 A1 | 12/2022 | Hollinger | |

FOREIGN PATENT DOCUMENTS

| | | |
|---|---|---|
| EP | 3086136 A1 | 10/2016 |
| KR | 1020070045407 A | 5/2007 |
| KR | 1020170065254 A | 6/2017 |
| KR | 101770795 B1 | 8/2017 |
| KR | 1020170117658 A | 10/2017 |

OTHER PUBLICATIONS

Extended European Search Report, for European Patent App. No. 18873404.0, mailed Oct. 27, 2021, 10 pages.
How does TrackR work?, https://web.archive.org/web/20170811074649/http:/support.thetrackr.com:80/hc/en-us/articles/115002495343-How-does-TrackR-work-, Aug. 11. 2017, 3 pages.
Nokia Treasure Tag (WS-2) User Guide, Issue 2.4 EN, https://web.archive.org/web/20170601010745/https:/www.nokia.com/en_int/phones/sites/default/files/user-guides/Nokia_Treasure_Tag_WS-2_UG_en_GB.pdf, Jun. 1, 2017. 15 pages.
What is the difference between StickNFind, Button, TrackR, and Tile? Who bad the idea first? And what about the products themselves? What are the advantages of each?, https://www.quora.com/What-is-the-difference-between-StickNFind-Button-TrackR-and-Tile-Who-had-the-idea-first-And-what-about-the-products-themselves-What-are-the-advantages-of-each, Nov. 3, 2015, 3 pages.
Meet the Tile App, https://web.archive.org/web/20170906073523/https:/www.thetileapp.com/en-us/how-it-works, Sep. 6, 2017, 9 pages.
Ultra-Small Bluetooth Location Stickers, https://web.archive.org/web/20121202070007 /http://sticknfind.com/, Dec. 2, 2012, 3 pages.
International Search Report and the Written Opinion of the International Searching Authority mailed Feb. 25, 2019 in International Application No. PCT/US2018/058649, 12 pages.

\* cited by examiner

| User Identifier | Device Identifier | Device Type | Segment Identifier | Leader/Follower | Feedback |
|---|---|---|---|---|---|
| User_ID_1 | Device_ID_1 | Mobile Device | Segment_ID_1 | Lead | Audio \| Haptic \| Visual \| Email |
| User_ID_1 | Device_ID_2 | Sensory Device | Segment_ID_1 | Follower | Visual |
| User_ID_1 | Device_ID_3 | Sensory Device | Segment_ID_1 | Follower | Audio \| Visual |
| User_ID_2 | Device_ID_4 | Mobile Device | Segment_ID_2 | Lead | Audio \| Haptic \| Visual |
| User_ID_2 | Device_ID_5 | Sensory Device | Segment_ID_2 | Follower | None |
| User_ID_2 | Device_ID_6 | Mobile Device | Segment_ID_2 | Follower | Audio |

FIG. 5A

| Device Identifier | Location Information | Motion State | Motion Direction | Update Time Stamp |
|---|---|---|---|---|
| Device_ID_1 | (38.90029,-77.02761) | Moving | W | 1508267630557 |
| Device_ID_2 | (38.90029,-77.02761) | Moving | W | 1508267630600 |
| Device_ID_3 | (38.90029,-77.02761) | Not Moving | None | 1508267630100 |
| Device_ID_4 | (37.26112,-121.96154) | Not Moving | None | 1508267620000 |
| Device_ID_5 | (37.26112,-121.96154) | Not Moving | None | 1508267620000 |
| Device_ID_6 | (37.26112,-121.96154) | Not Moving | None | 1508267620000 |

FIG. 5B

| User Identifier | User Name | Phone Number | Email Address |
|---|---|---|---|
| User_ID_1 | John Doe | (555) 555-5550 | JohnDoe@Ipsum.com |
| User_ID_2 | Jane Doe | (555) 555-5555 | JaneDoe@Ipsum.com |

FIG. 5C

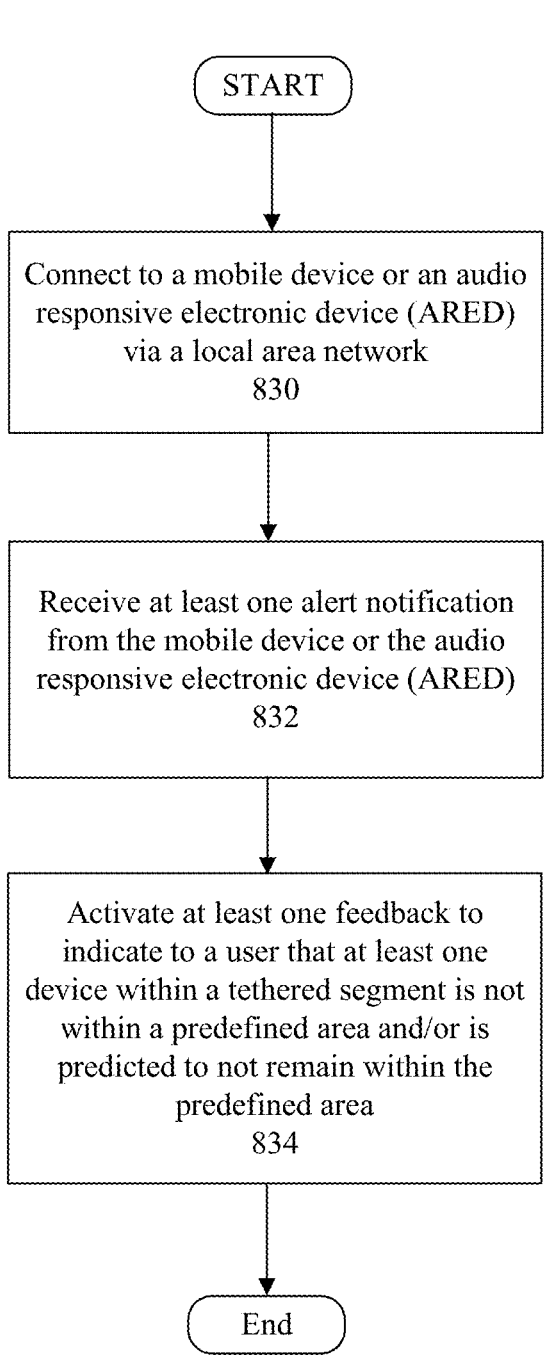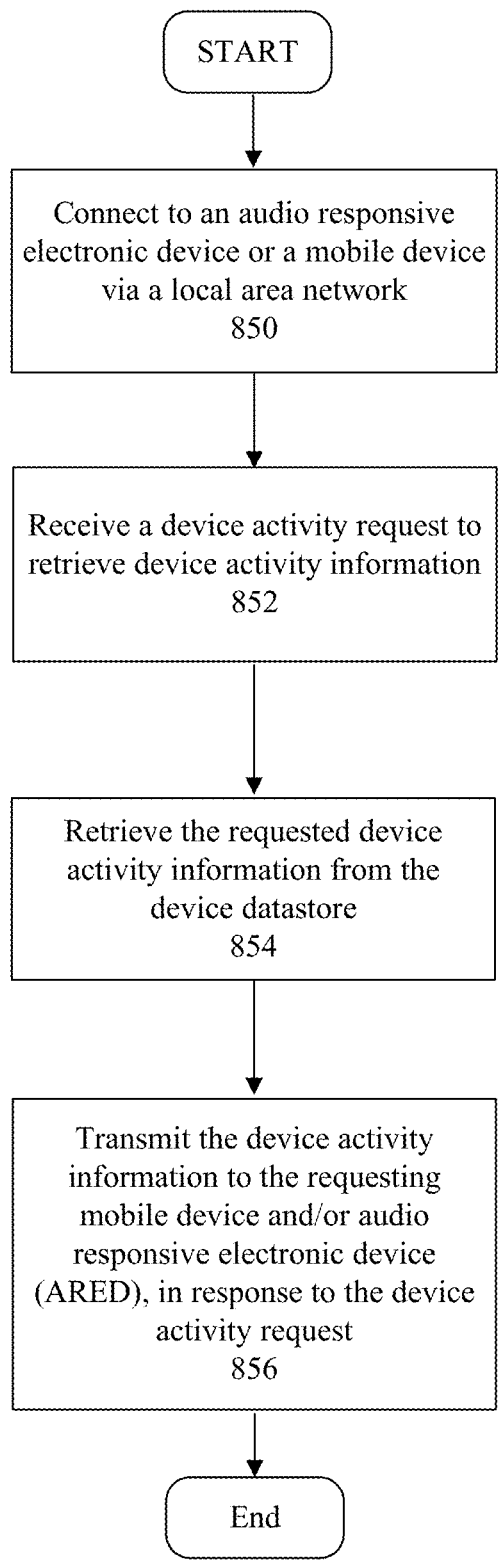
FIG. 8B　　　　FIG. 8C

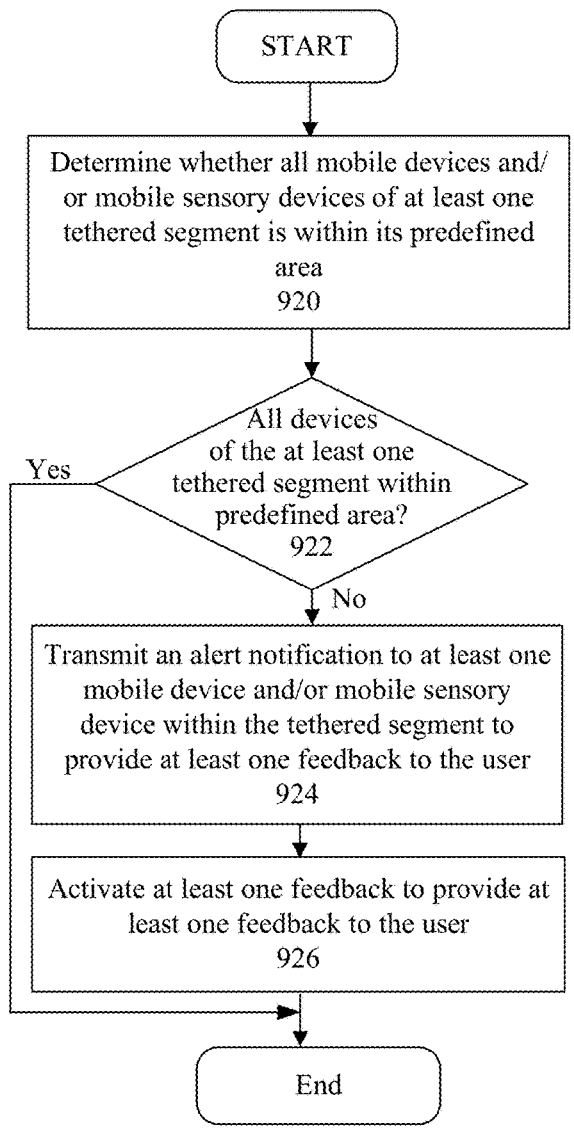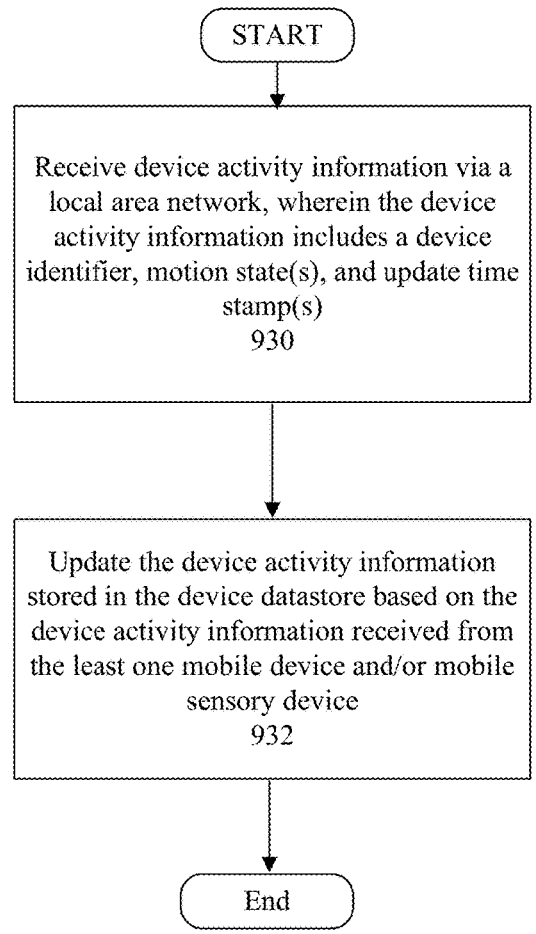
FIG. 9B
FIG. 9C

TRACKING PROXIMITIES OF DEVICES AND/OR OBJECTS

CROSS REFERENCE TO RELATED APPLICATIONS

This application is a continuation of U.S. Non-Provisional patent application Ser. No. 17/880,293, filed Aug. 3, 2022, which is a continuation of Ser. No. 17/156,937, filed Jan. 25, 2021, which is a continuation of U.S. Non-Provisional patent application Ser. No. 16/712,738, filed Dec. 12, 2019, which is a continuation of U.S. Non-Provisional patent application Ser. No. 16/281,901, filed Feb. 21, 2019, which is a continuation of U.S. Non-Provisional patent application Ser. No. 15/802,719, filed Nov. 3, 2017, all of which are herein incorporated by reference in their entireties.

BACKGROUND

Field

This disclosure is generally directed to tracking proximities of devices and/or objects.

Background

From work place entry devices to vehicle entry devices and other personal effects such as wallets and mobile phones, the number of devices and objects that users may be required to carry with them has increased over time. Coupled with numerous responsibilities that the users may be tasked to handle under strict timelines, being mindful to carrying these objects and devices has also increased importance. Oftentimes, the consequences of forgetting or misplacing any one of these devices (e.g., entry devices) or objects (e.g., wallet) could result in substantial decrease in productivity. Accordingly, a solution is needed to track the proximity of various devices and objects.

SUMMARY

Provided herein are system, apparatus, article of manufacture, method and/or computer program product embodiments, and/or combinations and sub-combinations thereof, for tracking proximities of devices and/or objects.

An embodiment includes a computer implemented method for tracking proximities of devices and/or objects. The method may operate by determining whether a plurality of devices of a tethered segment is within a predefined area and determining that a first device and a second device of the plurality of devices are inside the predefined area. The method may also operate by predicting whether the first device will move outside the predefined area without the second device. The method may further operate by transmitting at least one alert notification to at least one device based at least partially on the prediction that the first device will move outside the predefined area without the second device, wherein the alert notification identifies the first device and indicates that the first device is predicted to move outside the predefined area without the second device.

Another embodiment includes a tracking device for tracking proximities of utility devices and/or objects. The tracking device may include at least one processor and a memory coupled to the at least one processor and configured to determine whether a plurality of devices of a tethered segment are inside or outside a predefined area and determine that a first device of the plurality of devices is outside of the predefined area based at least partially on the determination of whether the plurality of devices are inside or outside the predefined area. The at least one processor may be further configured to transmit at least one alert notification to at least one device based at least partially on the determination that the first device is outside the predefined area, wherein the alert notification identifies the first device outside the predefined area.

A further embodiment includes a tangible computer-readable device having instructions stored thereon that, when executed by at least one computing device, causes the at least one computing device to perform operations. The operations may include, without limitation, determining whether a plurality of devices of a tethered segment are inside or outside a predefined area and determining that a first device of the plurality of devices is outside of the predefined area based at least partially on the determination of whether the plurality of devices are inside or outside the predefined area. The operations may further include, without limitation, transmitting at least one alert notification to at least one device based at least partially on the determination that the first device is outside the predefined area, wherein the alert notification identifies the first device outside the predefined area.

BRIEF DESCRIPTION OF THE FIGURES

The accompanying drawings are incorporated herein and form a part of the specification.

FIGS. 5A-5C illustrate example information stored in a device datastore according to some embodiments.

FIGS. 8A-8C illustrate example processing operations that may be performed by a mobile device and/or a mobile sensory device according to some embodiments.

FIGS. 9A-9E illustrate example processing operations performed by a mobile device and/or an ARED according to some embodiments.

Figure 1:
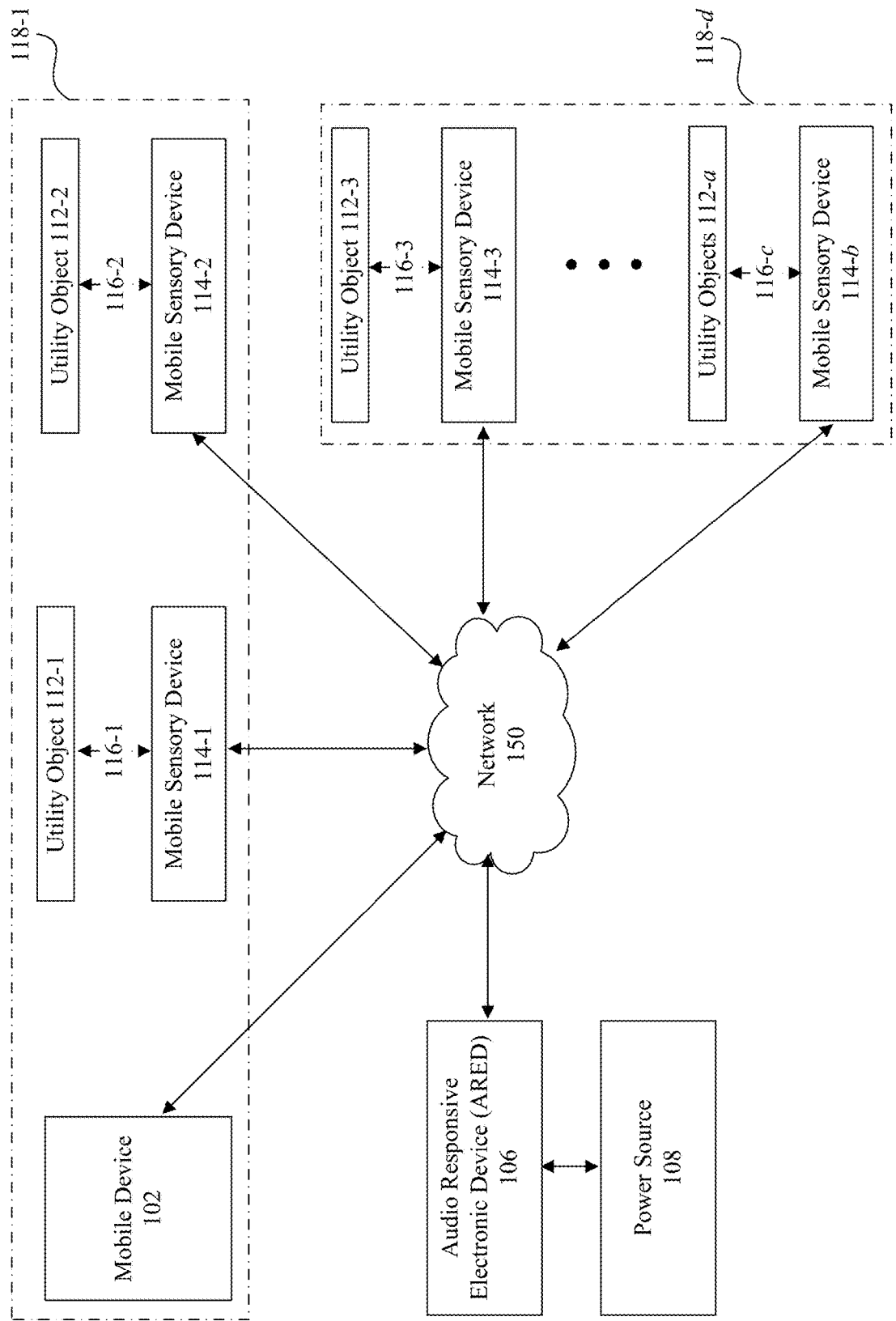
FIG. 1 illustrates a mobile sensory system for tracking devices and/or objects according to some embodiments.

Like reference numerals refer to corresponding parts throughout the several views of the drawings. Additionally, generally, the left-most digit(s) of a reference number identifies the drawing in which the reference number first appears. Furthermore, one or more designators to the right of a reference number such as, for example, "a" and "b" and "c" and other similar designators are intended to be variables representing any positive integer. Thus, for example, if an implementation sets a value for a=4, then a set of elements 104-*a* may include elements 114-1, 114-2, 114-3, and 114-4.

DETAILED DESCRIPTION

FIG. 1 illustrates a block diagram according to an example embodiment of a mobile sensory system 100. In particular, the mobile sensory system 100 may include one or more utility objects 112-a, one or more mobile sensory devices 114-b, a mobile device 102, and optionally, an audio responsive electronic device (ARED) 106. In an embodiment, the ARED 106 may be operatively coupled to a power source 108, which may be an external power source configured to provide continuous power to the ARED 106.

In an embodiment, the one or more mobile sensory devices 114-b, mobile device 102, and optionally, ARED 106 may all be communicatively and/or operatively coupled together via network 150. In various embodiments, the network 150 may include, without limitation, a computer and/or telecommunications network which may enable coupled and/or interconnected systems and/or devices to communicate information between and among each other. In various embodiments, the network 150 may generally include, without limitation, intranet, extranet, Internet, and/or any other local, regional, global telecommunications network. In some embodiments, the network 150 may be limited to a local area network such as, for example, a local area network in a business office and/or home residence.

In an embodiment, the utility objects 112-a may generally represent any physical item, objects, and/or personal effects, that a user would like to keep track of their physical location, maintain physical proximity with and/or receive one or more notifications when the user may have forgotten to bring these utility objects 112-a with him/her. For example, utility objects may include, without limitation, wallets, keys, laptops, tablets, mobile phones, and/or any other physical objects that a user may want to track their physical location of. Additionally, in embodiments where utility objects 112-a are electronic devices, these devices may also be communicatively and/or operatively coupled to network 150.

In an embodiment and to keep track of these various utility objects 112-a, a user may physically couple a mobile sensory device such as mobile sensory device 114-1, 114-2, 114-3 . . . 114-b to the one or more utility objects 112-a. The physical coupling may include, without limitation, hook and loop fasteners (e.g., Velcro, etc.), physical clips, negative fluid pressure attachment devices (e.g., suction pads/cups, etc.), temporary and/or permanent adhesives, and/or any other coupling that can physically bind a mobile sensory device to various utility objects 112-a.

In an embodiment and to track of these various utility objects 112-a, the mobile sensory devices 114-b may be generally configured to perform passive tracking operations which generally enable a designated lead device or an ARED to perform active tracking operations. These passive tracking operations may include, without limitation: (1) detect physical motion or movement (e.g., acceleration, deceleration, angular rotation, etc.); (2) transmit device activity information corresponding to the detected physical motion or movement to the ARED and/or designated lead device (e.g., mobile device 102 which may be designated as the lead mobile device); (3) receive alert notification from a designated lead device and/or ARED indicating that at least one mobile sensory device or mobile may be leaving the physical proximity; and/or (4) activating at least one feedback, in response to the alert notification.

Furthermore, in addition to transmitting device activity information upon detection of physical motion or movement, the mobile sensory devices 114-b may also be configured to provide device activity information upon request. Thus, in an embodiment the mobile sensory devices 114-b may also be generally configured to: (1) receive a request for device activity information (i.e., device activity request) from a designated lead device and/or an ARED; and/or (2) transmit a device activity response to the mobile device and/or ARED, in response to the device activity request.

In an embodiment, the mobile device 102 may be generally configured to operate as a designated lead device (i.e., a designated lead mobile device) or as a follower device (i.e. a follower mobile device). As a follower mobile device, the follower mobile device (e.g., mobile device 102) may be configured to perform passive tracking operations in a similar manner as the one or more mobile sensory devices 114-b discussed above and herein. This enables the follower mobile device 102 to be tracked in a similar manner to a mobile sensory device without physically attaching a mobile sensory device to the follower mobile device.

As a designated lead mobile device, the mobile device 102 may perform active tracking operations that actively assist in tracking various utility objects 112-b and/or follower mobile devices, when designated lead mobile device is not within predefined area of the ARED 106. These active tracking operations may include, without limitation, determining whether a mobile sensory device and/or another mobile device in a predefined set of devices for a user (i.e., a tethered segment further discussed below) is and/or will remain inside a predefined area of the designed lead mobile device (e.g., within a physical proximity of a designed lead mobile device 102).

In some embodiments, the predefined area of the designated lead mobile device may include a limited geographical area surrounding the designed lead mobile device. The limited geographical area surrounding or otherwise enclosing the designed lead mobile device may be defined, for example, by the wireless communications range between the designed lead mobile device and various devices. In some embodiments, the designed lead mobile device may also be substantially near the center of the limited geographical area. Similarly and in some embodiments, the predefined area of the ARED may include a limited geographical area surrounding or otherwise enclosing the ARED. The limited geographical area may be defined by the wireless communications range between the ARED and various devices. However, this disclosure is not limited to this example. Other techniques and technologies for establishing the limited geographical area may also fall within the scope and spirit of this disclosure.

Based on these determinations, the designated lead mobile device may transmit an alert notification to at least one device (e.g., mobile sensory device and/or a follower mobile device). The alert notification may indicate that the designed lead mobile device 102 has determined that a device is not inside the limited geographical area and/or predicted to not remain in the limited geographical area. In some embodiments, the alert notification may be transmitted to only devices within the predefined set of devices for the user, or may be transmitted to other devices previously identified by the user. The alert notification may also identify the device that is not within the limited geographical area.

As the designated lead mobile device 102 that is actively assisting in tracking various devices, the lead mobile device 102 may be generally configured to: (1) receive device activity information from follower mobile devices (not shown) and/or follower mobile sensory devices 114-b; and (2) update device activity information stored for each device in a device datastore based on the received device activity information.

Additionally, for each tethered segment, the designated lead mobile device 102 may be configured to: (1) determine whether all the follower devices are within physical proximity of the designated lead mobile device 102; and/or (2)

predict whether all the follower devices will remain within or leave the physical proximity of the designated lead mobile device 102. The designated lead mobile device 102 may be further configured to: (1) transmit at least one alert notification to at least one of a follower device; and/or (2) activate at least one feedback to notify the user, when the designated lead mobile device 102 determines that a follower device may not be within physical proximity of the designated lead mobile device 102 and/or predicts that a follower device will not remain within physical proximity of the designated lead mobile device 102.

In an embodiment where an ARED 106 is optionally available in a local area network, the ARED 106 may be configured to perform similar active tracking operations as a designated lead mobile device discussed above and herein. In those embodiments, a designed lead mobile device (e.g., designated lead mobile device 102) within the limited geographical area of the ARED 106 (e.g., within physical proximity of the ARED 106) may be configured to perform functions of a follower mobile device. This allows the ARED 106 to actively track mobile sensory devices and/or mobile devices rather than the designed lead mobile device performing active tracking operations in order to reduce power consumption of the designed lead mobile device.

In an embodiment and to actively track mobile sensory devices and/or mobile devices, the operations ARED 106 may perform active tracking operations similarly discussed above and herein with respect to the designed lead mobile device 102. These active tracking operations for the ARED 106 may include, without limitation: (1) determining that a first mobile sensory device and/or first mobile device in a predefined set of devices for a user (i.e., a tethered segment further discussed below) is not and/or will not remain inside a limited geographical area surrounding the ARED 106 (e.g., within a physical proximity of the ARED 106); and (2) determining that a second mobile sensory device and/or second mobile device in the same predefined set of devices for a user is and/or will remain inside a limited geographical area surrounding the ARED 106.

Based on these determinations, the active tracking operations may further include, without limitation, transmitting an alert notification to at least one device (e.g., mobile sensory device and/or a follower mobile device). The alert notification may indicate that the ARED 106 has determined that the first device has left or will leave the geographical area while the second device remains within the geographical area. In some embodiments, the alert notification may be transmitted to only devices within the predefined set of devices for the user. The alert notification may also identify the device that is not within the limited geographical area, i.e., identify the first device, which is leaving the limited geographical area of the ARED 106.

It should be understood that, while the ARED 106 and mobile devices are described herein as performing certain functions and/or operations, those functions and/or operations may instead be performed by other monitoring devices, components and/or processes.

In an embodiment and to ensure that alert notifications are given to a specific user regarding utility objects 112-a that only the specific user care about, each mobile device (e.g., mobile device 102) and mobile sensory device (e.g., mobile sensory device 114-b) may be associated with tethered segments 118-d. Thus, each tethered segment (e.g., tethered segment 118-1, 118-2, etc.) may include one or more tethered devices such as one or more mobile devices and/or one or more mobile sensory devices.

In an embodiment and for any tethered devices that are within the same tethered segment 118-1, at least one tethered device may be configured to provide feedback (e.g., a visual feedback, an auditory feedback, haptic feedback, text message, email message, etc.) to alert a user. For example, the at least one tethered device may be configured to provide feedback, when at least one tethered device within the tethered segment (e.g., tethered segment 118-1) is determined and/or otherwise predicted to not be within physical proximity of another device (e.g., mobile device 102, a mobile sensory device 112-1, 112-2, etc.) in the same tethered segment (e.g., tethered segment 118-1).

Figure 2:
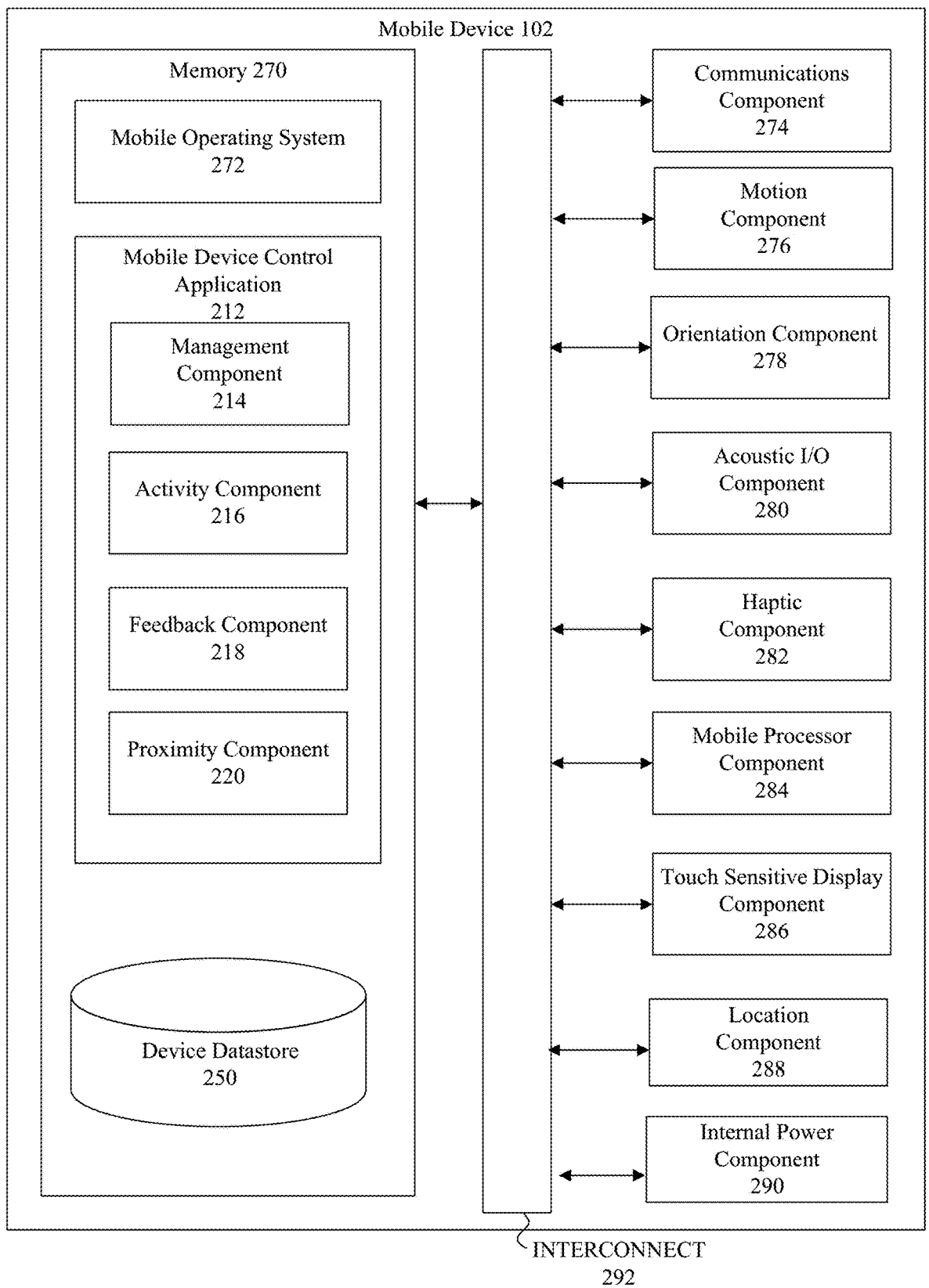
FIG. 2 illustrates components of a mobile device according to some embodiments.

FIG. 2 illustrates a block diagram of an example embodiment of the mobile device 102. It is to be appreciated that while FIG. 2 illustrates one example embodiment of the mobile device 102, the example embodiment is not limited to this context.

In an embodiment, the mobile device 102 may be generally arranged to provide mobile computing and/or mobile communications and may include, but are not limited to, memory 270, communications component 274, motion component 276, and orientation component 278, acoustic input/output component 280, haptic component 282, mobile processor component 284, touch sensitive display component 286, location component 288, internal power component 290, where each of the components and memory 270 may be operatively connected via interconnect 292.

In an embodiment, the memory 270 may be generally arranged to store information in volatile and/or nonvolatile memory, which may include, but is not limited to, read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM) flash memory, polymer memory such as ferroelectric polymer memory, ovonic memory, phase change or ferroelectric memory, silicon-oxide-nitride-oxide-silicon (SONOS) memory, solid state memory devices (e.g., USB memory, solid state drives SSD, etc.), and/or any other type of storage media configured for storing information.

In an embodiment, the memory 270 may include instruction information arranged for execution by the mobile processor component 284. In that embodiment, the instruction information may be representative of at least one operating system 272, one or more applications, which may include, but are not limited to, mobile device control application 212. In an embodiment, the memory 270 may further include device datastore 250 which may be configured to store device configuration information further illustrated in FIG. 5A, device activity information further illustrated in FIG. 5B, and device user information further illustrated in FIG. 5C.

In an embodiment, the mobile operating system 272 may include, without limitation, mobile operating systems (e.g., Apple®, iOS®, Google® Android®, Microsoft® Windows Phone®, Microsoft® Windows®, etc.) general arranged to manage hardware resources (e.g., one or more components of the mobile device 102, etc.) and/or software resources (e.g., one or more applications of the mobile device 102, etc.).

In an embodiment, the communications component 274 may be generally arranged to enable the mobile device 102 to communicate, directly and/or indirectly, with various devices (e.g., mobile sensory devices 114-b, ARED 106, etc.) in the mobile sensory system 100. The communications component 274 may include, among other elements, a radio frequency circuit (not shown) configured for encoding and/or decoding information and receiving and/or transmitting the encoded information as radio signals in frequencies consistent with the one or more wireless communications standards (e.g., Bluetooth, Wireless IEEE 802.11, WiMAX IEEE 802.16, Global Systems for Mobile Communications (GSM), Enhanced Data Rates for GSM Evolution (EDGE), Long Term Evolution (LTE), Bluetooth standards, Near Field Communications (NFC) standards, etc.).

In an embodiment, the motion component 276 may be generally arranged to detect motion of the mobile device 102 in one or more axes. The motion component 276 may include, among other elements, motion sensor (e.g., accelerometer, micro gyroscope, etc.) to convert physical motions applied to or exerted on the mobile device 118-1 into motion information.

In an embodiment, the orientation component 278 may be generally arranged to detect magnetic fields for measuring the strength of magnetic fields surrounding the mobile device 102. The orientation component 278 may include, among other elements, magnetic sensor (e.g., magnetometer, magnetoresistive permalloy sensor, etc.) to convert magnetic field applied to or exerted on the mobile device 102 into orientation information, which may identify a number of degrees from a reference orientation the mobile device 102 is oriented or otherwise pointed.

In an embodiment, the acoustic input/output (I/O) component 280 may be generally arranged for converting sound, vibrations, or any other mechanical waves received by the mobile device 102 into digital or electronic signals representative of acoustic input information utilizing one or more acoustic sensors (e.g., microphones, etc.), which may be located or positioned on or within the housing, case, or enclosure of the mobile device 102 to form an microphone array. Additionally, the acoustic I/O component 280 may be further arranged to receive acoustic output information and convert the received acoustic output information into electronic signals to output sound, vibrations, or any other mechanical waves utilizing the one or more electroacoustic transducers (e.g., speakers, etc.) which may be located or positioned on or within the housing, case, or enclosure of the mobile device 102. Additionally or alternatively, the acoustic output information and/or the covered electronic signals may be provided to one or more electroacoustic transducers (e.g., speakers, etc.) operatively coupled to the mobile device 102 via wired and/or wireless connections.

In an embodiment, the haptic component 282 may be generally arranged to provide tactile feedback with varying strength and/or frequency with respect to time through the housing, case, or enclosure of the mobile device 102. Moreover, the haptic component 282 may include, among other elements, a vibration circuit (e.g., an oscillating motor, vibrating motor, etc.) arranged to receive haptic output information and convert the received haptic output information to mechanical vibrations representative of tactile feedback.

In an embodiment, the mobile processor component 284 may be generally arranged to execute instruction information including one or more instructions. In an embodiment, the processor component 284 may be a mobile processor component or system-on-chip (SoC) processor component which may comprise, among other elements, processor circuit, which may include, but is not limited to, at least one set of electronic circuits arranged to execute one or more instructions. Examples of mobile processor components 284 may include, but is not limited to, Qualcomm® Snapdragon®, Nvidia® Tegra®, Intel® Atom®, Samsung® Exynos, Apple® A7®, Apple® A8®, or any other type of mobile processor(s) arranged to execute the instruction information including the one or more instructions stored in memory 270.

In an embodiment, the touch sensitive display component 286 may be generally arranged to receive and present visual display information, and provide touch input information based on detected touch based or contact based input. Moreover, the touch sensitive display component 286 may include, among other elements, display device (e.g., liquid-crystal display, light-emitting diode display, organic light-emitting diode display, etc.) for presenting the visual display information and touch sensor(s) (e.g., resistive touch sensor, capacitive touch sensor, etc.) associated with the display device 268 to detect and/or receive touch or contact based input information associated with the display device of the mobile device 102. Additionally, the touch sensor(s) may be integrated with the surface of the display device, so that a user's touch or contact input may substantially correspond to the presented visual display information on the display device.

In an embodiment, the location component 288 may be generally arranged to receive positioning signals representative of positioning information and provide location information (e.g., approximate physical location of the mobile device 102) determined based at least partially on the received positioning information. Moreover, the location component 288 may include, among other elements, positioning circuit (e.g., a global positioning system (GPS) receiver, etc.) arranged to determine the physical location of the mobile device 102. In some embodiments, the location component 288 may be further arranged to communicate and/or interface with the communications component 274 in order to provide greater accuracy and/or faster determination of the location information.

In an embodiment, the internal power component 290 may be generally arranged to provide power to the various components and the memory of the mobile device 102. In an embodiment, the internal power component 290 may include and/or be operatively coupled to an internal and/or external battery configured to provide power to the various components (e.g., communications component 274, motion component 276, memory 270, etc.).

In an embodiment, the mobile device control application 212 may be generally configured to perform active tracking operations that actively assist in tracking of various utility objects 112-b and/or follower mobile devices within a limited geographical area surrounding the mobile device 102, when the mobile device 102 is: (1) a designed lead mobile device; and (2) not within physical proximity of an ARED. Additionally or alternatively, the mobile device control application 212 may also be generally configured to perform passive tracking operations that passively assist in tracking of the mobile device 102 within a limited geographical area surrounding a designated lead mobile device or an ARED, when the mobile device 102 is: (1) designated as a follower device; or (2) not within physical proximity of an ARED.

In an embodiment, the mobile device control application 212 may be further configured to perform management operations that enable modification and/or updates to device configuration information and/or device user information for various devices associated with a user of the mobile device 102 and/or ARED 106. To perform these operations discussed above, the mobile device control application 212 may include, without limitation, management component 214, activity component 216, feedback component 218, and proximity component 220.

To perform the management operations, the management component 214 may be generally configured to provide visual display information representative of one or more user interface (UI) views to the touch sensitive display component 286. Additionally, the management component 214 may be generally configured to receive touch or contact based input information corresponding to the one or more UI views to enable a user to: (1) add and/or remove one or more mobile sensory devices 114-a and/or mobile device 102 to one or more a tethered segments (e.g., tethered segment 118-1, etc.); (2) assign or otherwise designate a lead and follower devices within the one or more a tethered segments (e.g., tethered segment 118-1, etc.); (3) configure the activation of one or more indicators associated with the mobile device 102 and/or mobile sensory devices 114-b in order to provide at least one feedback to the user, when a mobile device 102 or a mobile sensory device leaves physical proximity with respect to each other; and/or (4) associate contact information with a user of the mobile sensory system 100.

In embodiments where the mobile device 102 is within the physical proximity of an ARED 106 (e.g., operatively and/or communicatively coupled to the ARED 106 in a local area network 150), the management component 214 may be generally configured to perform passive tracking operations. In these embodiments, the management component 214 may be configured to communicate with the ARED 106 and provide device activity information generated by the activity component 216 to the ARED 106. Additionally, the management component 214 may also be generally configured to receive alert notifications from ARED 106 indicating that one or more devices within a tethered segment is not within physical proximity of each other. In response to the alert notification, the mobile device 102 may also be configured to provide auditory, haptic, and/or visual feedback to the user of the mobile device 102 based on the device configuration information indicating various types of feedback enabled by the user.

In addition to or alternative to providing feedback directly to the user via mobile device 102, the ARED 106 may also be configured to transmit email messages and/or text messages to the user of the mobile device 102 across various networks (e.g., Cellular Networks, Wide Area Networks (WAN), Virtual Private Networks (VPNs), Internet, etc.). Thus, in an embodiment, the ARED 106 may be operatively and communicatively coupled to one or more Mail Transfer Agents (e.g., mail servers)(not shown) and may be further configured to transmit email messages to the user of the mobile device 102 via the one or more Mail Transfer Agents.

Additionally or alternatively, the ARED 106 may also be operatively and communicatively coupled to one or more Short Messaging Service (SMS) servers (not shown) may be further configured to transmit text messages to the user of the mobile device 102 via the SMS servers. It is to be appreciated that the ARED 106 may be configured to determine a user's phone number and email address by cross referencing the device configuration information further illustrated in FIG. 5A, device activity information further illustrated in FIG. 5B, and/or device user information further illustrated in FIG. 5C.

In embodiments where the mobile device 102 may be a designated lead mobile device 102 and the mobile device 102 may not be within physical proximity of the ARED 106, the management component 214 may be generally config-ured to perform active tracking operations. In these embodiments, the management component 214 may be configured to: (1) communicate with the one or more follower mobile sensory devices 114-b and/or other mobile devices (not shown); and/or (2) receive device activity information generated by an activity component of a respective mobile sensory device and/or other mobile devices (e.g., activity component 216 of mobile sensory device 114-1) within a tethered segment.

In embodiments where the mobile device 102 is configured to perform active tracking operations and after determining, by the proximity component 220, that the one or more one or more mobile sensory devices 114-b and/or other mobile devices within the tethered segment may leave the physical proximity of the designated lead mobile device 102, the management component 214 may be further configured to activate at least one feedback via the feedback component 218, which may include auditory, haptic, and/or visual feedback based on device configuration information further discussed with respect to FIG. 5A.

In an embodiment, the activity component 216 may be generally configured to assist in performing passive tracking operations. To assist in passive tracking operations, the activity component 216 may be generally configured to: (1) retrieve or otherwise receive motion information from the motion component 276 and orientation information from the orientation component 278; and (2) generate device activity information for the mobile device 102 based on the motion information and orientation information. Optionally, the activity component 216 may also supplement the device activity information with location information received from the location component 288. The generated device activity information may be temporarily and cumulatively stored in the sensory device datastore 250 of memory 270 as time series data and retrieved by the management component 214 for transmission to a designated lead device and/or ARED.

In an embodiment, the feedback component 218 may be generally configured to provide visual feedback, auditory feedback, and/or haptic feedback, in response to an alert notification. In embodiments where the mobile device 102 is configured to perform passive tracking operations, the mobile device 102 may be configured to receive the alert notification which may be transmitted from the ARED 106 or another mobile device that is performing active tracking operations. The receipt of the alert notification may indicate that the ARED 106 or another mobile device that is performing the active tracking operations has determined and/or predicted that a follower device may no longer be within physical proximity of the designated lead device for a particular tethered segment of the mobile device 102. In embodiments where the mobile device 102 is configured to perform active tracking operations, the proximity component 220 may be configured to generate an alert notification, when the proximity component 220 determines and/or predicts that a follower device is no longer within physical proximity of the designated lead device within the tethered segment.

In an embodiment, the proximity component 220 may be generally configured to assist a designated lead device (i.e., a designated lead mobile device) in performing active tracking operations. To perform active tracking operations, the proximity component 220 may be generally arranged to: (1) determine whether a follower device (e.g., mobile sensory device 114-1, 114-2, etc.) is within physical proximity of a designated lead device (e.g., mobile device 102); and/or (2) predict whether the follower device will remain or leave the physical proximity of the designated lead device (e.g., mobile device 102) within a tethered segment (e.g., tethered segment 118-1). Each of these operations will be further discussed below in turn and in the order discussed above.

In an embodiment, the proximity component 220 may determine whether a follower device (e.g., mobile sensory device 114-1, 114-2, etc.) is within the physical proximity of a designated lead device (e.g., mobile device 102) by polling the one or more follower devices via direct peer-to-peer wireless connections and/or protocols (e.g., Bluetooth standards, 802.11 wireless standards, etc.). In an embodiment, the proximity component 220 may determine that each of the follower device within a tethered segment are within physical proximity of the designated lead device, when the proximity component 220 may communicate with each of the follower device via one or more wireless connections and/or protocols on the local area network.

In an embodiment, and to poll the one or more follower devices, the proximity component 220 may be configured to determine whether each of the follower devices within a tethered segment is network reachable by the designated lead device via a direct peer-to-peer wireless connection to the one or more follower devices. Additionally or alternatively and to poll the one or more follower devices, the proximity component 220 may be configured to request device activity information generated by the activity component (e.g., activity component 316 of FIG. 3) of the one or more follower devices.

For example, the proximity component 220 may be configured to determine that a follower device (e.g., mobile sensory electronic device 114-1) that is in the same tethered segment 118-1 as a designated lead device (e.g., mobile device 102), is also within the physical proximity of the designated lead device, when the proximity component 220 may ping or otherwise communicate with the follower device via a direct peer-to-peer wireless connection. Similarly, the proximity component 220 may be configured to determine that the one or more follower devices (e.g., mobile sensory devices 114-1 and 114-2) may not be within physical proximity of the designated lead device for a specific unit of time, when the proximity component 220 is unable to ping or otherwise unable to communicate with a follower device via a direct peer-to-peer wireless connection within a specific communication timeout period (e.g., 5 seconds, 10 seconds, 30 seconds, 60 seconds, etc.).

In an embodiment and to perform active tracking operations, the proximity component 220 may be further configured to predict whether one or more follower devices (e.g., mobile sensory device 114-1, 114-2, etc.) will remain within the physical proximity of a designated lead device (e.g., mobile device 102) within a tethered segment (e.g., tethered segment 118-1, etc.). by: (1) receiving device activity information from the one or more follower devices that are moving; (2) updating the device activity information for each device stored in the device datastore 250 based on the received device activity datastore; and/or (3) polling the one or more follower devices, in response to determining that designated lead device is moving based at least partially on the device activity information generated by the activity component 216.

For example, the proximity component 220 may predict that a follower device such as mobile sensory electronic device 114-1 that is within the same tethered segment 118-1 as a designated lead mobile device such as mobile device 102, will remain within physical proximity of the lead device, when the proximity component 220 determines that the mobile device 102 is moving substantially at the same time and/or substantially in the same direction as the mobile sensory device 114-1.

Continuing with the above example and to determine whether the mobile device 102 is moving substantially at the same time and/or substantially in the same direction as the mobile sensory device 114-1, the proximity component 220 may be configured to compare the most recent in time device activity information of the mobile device 102, (i.e., the lead device activity information) with the most recent in time device activity information of the at least one mobile sensory device such as mobile sensory devices 114-1 and 114-2 (i.e., the one or more follower device activity information).

Continuing with the above example, the proximity component 220 may be further configured to analyze and compare the cumulative device activity information for a past time period (e.g., past five (5) seconds, past ten (10) seconds, etc.) immediately before the most recent in time device activity information for each of the at least one mobile sensory devices or other mobile devices. For example and based on the analysis and comparison of the past cumulative and most recent in time device activity information, the proximity component 220 may be configured to determine that all devices within a tethered segment started moving at substantially same time, when the maximum time difference between a first device to transition from a non-moving state to a moving state and a last device to transition from a non-moving state to a moving state does not exceed a specific period of time (e.g., 500 milliseconds, one (1) second, etc.).

Based on the above analyses and comparisons, the proximity component 220 may be configured to determine that the mobile device 102 is moving substantially at the same time as the mobile sensory device 114-1 and 114-2. As such, the proximity component 220 may predict that one or more follower devices such as mobile sensory devices 114-1 and 114-2 may remain within physical proximity of the lead device for a specific unit of time (e.g., 5 seconds, 10 seconds, 30 seconds, 60 seconds, etc.).

Continuing with the above example, the proximity component 220 may be configured to predict that the one or more follower devices such as mobile sensory devices 114-1 and 114-2 may not remain within physical proximity of the lead device for a specific unit of time, when the proximity component 220 determines that the mobile device 102 is not moving substantially at the same time or not moving substantially in the same direction as the mobile sensory device 114-1 and 114-2.

Based on the above prediction, determination, and the device configuration information, the proximity component 220 may also be configured to generate an alert notification, which may be used by the feedback component 218 to provide auditory, haptic, and/or visual feedback to notify the user of the mobile device 102 that one or more follower devices such as the mobile sensory device 114-1 and/or 114-2 within the tethered segment 118-1 will not be within physical proximity of the mobile device 102. Additionally and based on the device configuration information, the alert notification may be transmitted to the one or more mobile sensory device 114-1 and/or 114-2 that did not move in substantially the same direction and/or at substantially the same time as mobile device 102.

Figure 3:
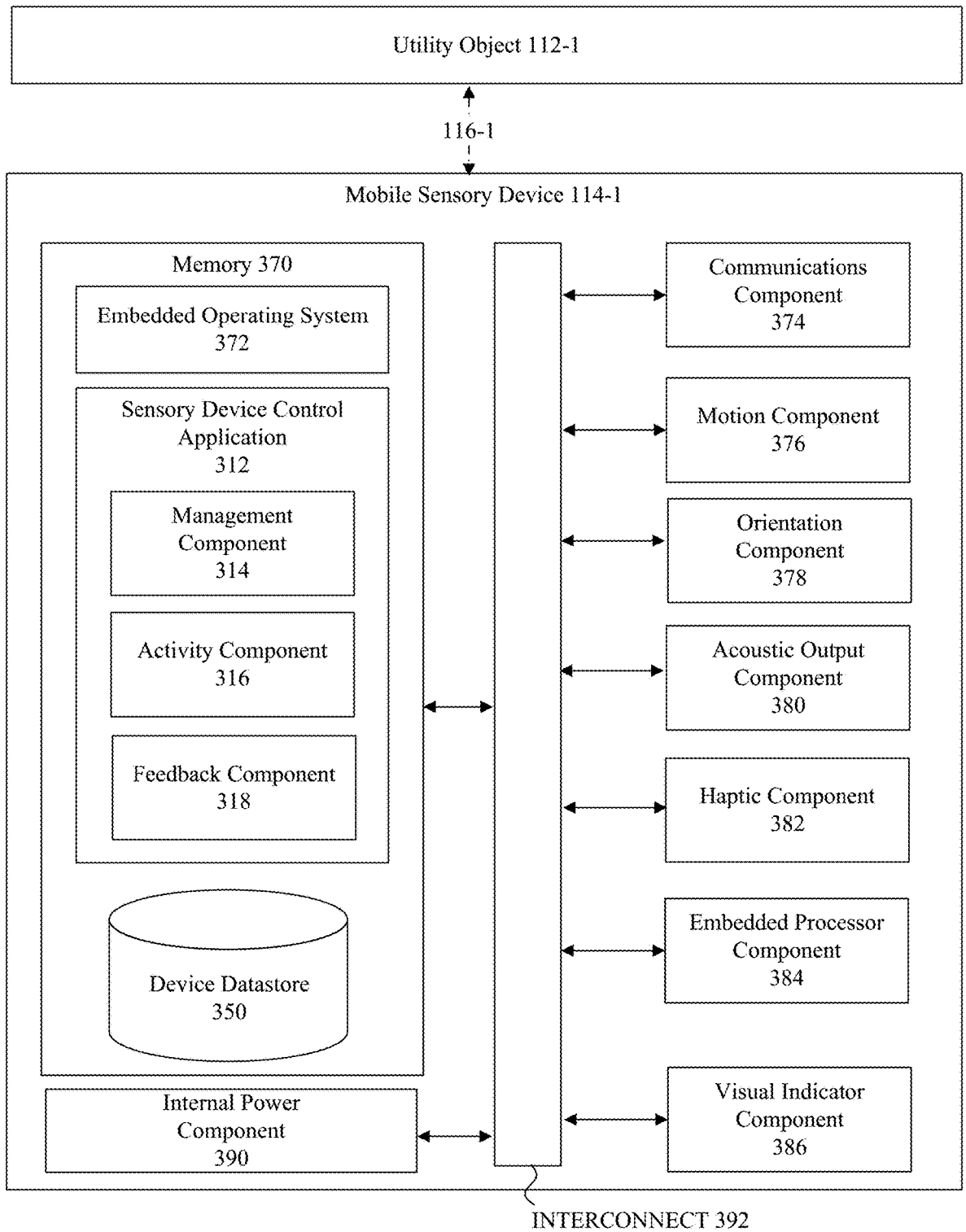
FIG. 3 illustrates components of a mobile sensory device according to some embodiments.

FIG. 3 illustrates a block diagram of an example embodiment of the mobile sensory device 114-1. It is to be appreciated that while FIG. 3 illustrates one example embodiment of the mobile sensory device 114-1, the example embodiment is not limited to this context. Additionally, it is to be appreciated those other mobile sensory devices (e.g., mobile sensory device 114-2, 114-3 . . . 114-*b*) may be similarly configured.

In an embodiment, the mobile sensory device 114-1 may be generally arranged to provide physical proximity tracking of a coupled utility device and may include, without limitation, memory 370, communications component 374, motion component 376, and orientation component 378, acoustic output component 380, haptic component 382, embedded processor component 384, visual indicator component 386, internal power component 390, where each of the components and memory 370 may be operatively connected via interconnect 392.

In an embodiment, the memory 370 may be generally arranged to store information in volatile and/or nonvolatile memory, which may include, but is not limited to, the memory previously discussed with respect to memory 270 and/or any other type of storage media configured for storing information. In an embodiment and similar to memory 270, the memory 370 may include instruction information arranged for execution by the embedded processor component 384. In that embodiment, the instruction information may be representative of at least one embedded operating system 372, one or more applications, which may include, but is not limited to, sensory device control application 312. In an embodiment, the memory 370 may further include sensory device datastore 350 which may be configured to store at least a portion of device configuration information further illustrated in FIG. 5A, device activity information further illustrated in FIG. 5B, and device user information further illustrated in FIG. 5C.

In an embodiment, the embedded operating system 372 may include, without limitation, light weight real-time and/or embedded operating systems (e.g., Texas Instruments Inc.® TI-RTOS, Wind River Systems® VxWorks®, etc.) general arranged to manage a limited set of hardware resources (e.g., one or more components of the mobile sensory device 114-1, etc.) and/or software resources (e.g., one or more applications of the mobile sensory device 114-1, etc.).

In an embodiment, the communications component 374 may be generally arranged to enable the mobile sensory device 114-1 to communicate, directly and/or indirectly, with various devices (e.g., mobile device 102, ARED 106, etc.) in the mobile sensory system 100. The communications component 374 may include, among other elements, a radio frequency circuit (not shown) configured for encoding and/or decoding information and receiving and/or transmitting the encoded information as radio signals in frequencies consistent with the one or more wireless communications standards (e.g., Bluetooth, Wireless IEEE 802.11, WiMAX IEEE 802.16, Global Systems for Mobile Communications (GSM), Enhanced Data Rates for GSM Evolution (EDGE), Long Term Evolution (LTE), Bluetooth standards, Near Field Communications (NFC) standards, etc.).

In an embodiment, the motion component 376 may be generally arranged to detect motion of the mobile sensory device 114-1 in one or more axes. The motion component 376 may include, among other elements, motion sensor (e.g., accelerometer, micro gyroscope, etc.) to convert physical motions applied to or exerted on the mobile sensory device 114-1 into motion information.

In an embodiment, the orientation component 378 may be generally arranged to detect magnetic fields for measuring the strength of magnetic fields surrounding the mobile device 102. The orientation component 378 may include, among other elements, magnetic sensor (e.g., magnetometer, magnetoresistive permalloy sensor, etc.) to convert magnetic field applied to or exerted on the mobile sensory device 114-1 into orientation information, which may identify a number of degrees from a reference orientation the mobile device 102 is oriented or otherwise pointed.

In an embodiment, the acoustic output component 380 may be generally arranged to receive acoustic output information and convert the received acoustic output information into electronic signals to output sound, vibrations, or any other mechanical waves. To convert the received acoustic output information to mechanical waves, acoustic output component 380 may utilize the one or more electroacoustic transducers (e.g., speakers, etc.), which may be located or positioned on or within the housing, case, or enclosure of the mobile sensory device 114-1.

In an embodiment, the haptic component 382 may be generally arranged to provide tactile feedback with varying strength and/or frequency with respect to time through the housing, case, or enclosure of the mobile sensory device 114-1. Moreover, the haptic component 382 may include, among other elements, a vibration circuit (e.g., an oscillating motor, vibrating motor, etc.) arranged to receive haptic output information and convert the received haptic output information to mechanical vibrations representative of tactile feedback.

In an embodiment, the embedded processor component 384 may be generally arranged to execute instruction information including one or more instructions. In an embodiment, the embedded processor component 384 may be an embedded processor component or system-on-chip (SoC) processor component which may comprise, among other elements, a processor circuit, which may include, but is not limited to, at least one set of electronic circuits arranged to execute one or more instructions. Additionally or alternatively, the embedded processor component 384 may be an embedded microcontroller component arranged to execute the one or more instructions.

In an embodiment, the visual indicator component 386 may be generally arranged to receive and present visual display information. Moreover, the visual indicator component 386 may include, among other elements, micro-display device (e.g., liquid-crystal display, light-emitting diode display, organic light-emitting diode display, etc.) for presenting the visual display information. Additionally or alternatively, the visual indicator component 386 may include one or more light-emitting diodes and/or organic light-emitting diodes mounted on the surface of the mobile sensory device to provide visual feedback.

In an embodiment, the internal power component 390 may be generally arranged to provide power to the various components and the memory of the mobile sensory device 114-1. In an embodiment, the internal power component 390 may include and/or be operatively coupled to an internal and/or external battery configured to provide power to the various components (e.g., communications component 374, motion component 376, memory 370, etc.). Additionally or alternatively, the internal power component 390 may generate and/or store power from surrounding electromagnetic radiation to power the one or more components of the mobile device 114-1 or otherwise charge the internal and/or external battery (not shown).

In an embodiment, the sensory device control application 312 may be generally configured to the mobile device control application 212 may also be generally configured to perform passive tracking operations that passively assist in tracking of the mobile sensory device 114-1 in a limited geographical area surrounding a designated lead mobile device or an ARED. In an embodiment, the sensory device control application 312 may include, without limitation, management component 314, activity component 316, and feedback component 318.

In an embodiment and to perform the passive tracking operations, the management component 314 may be configured to detect movement of the mobile sensory device 114-1. In response to the detection of movement of the mobile sensory device 114-1, the management component 314 may be configured to: (1) transition the mobile sensory device 114-1 from a lower energy consumption state to a higher energy consumption state; (2) connect with a mobile device (e.g., mobile device 102) or an ARED (e.g., ARED 106); and (3) transmit device activity information to a designated lead device (e.g., mobile device 102 which may be a designated lead mobile device) or an ARED, in response to detecting movement of the mobile sensory device 114-1.

In an embodiment, the management component 314 may also be configured to (1) connect to a mobile device (e.g., mobile device 102 which may be a designated lead mobile device) or an ARED (ARED 106); and (2) receive a device activity request from a mobile device (e.g., mobile device 102 which may be a designated lead mobile device) or an ARED (ARED 106). In response to receiving the device activity request, the management component 314 may be configured to: (1) optionally transition the mobile sensory electronic device from a lower-energy consumption state to a high-energy consumption state; (2) retrieve the requested device activity information from the device datastore 350; (3) transmit device activity information to the mobile device or the ARED that transmitted the device activity request; and/or (4) optionally transition the mobile sensory electronic device from a higher-energy consumption state to a lower-energy consumption state.

In an embodiment, the management component 314 may be further configured to receive an alert notification from a mobile device or ARED that is performing active tracking operations. The receipt of the alert notification may indicate that the mobile device or ARED that is performing the active tracking operations has determined and/or predicted that a follower device (e.g., mobile sensory device 114-1) may no longer be within physical proximity of the designated lead device (e.g. mobile device 102) for a particular tethered segment (e.g., tethered segment 118-1). In response to receiving the alert notification, the management component 314 may be configured to: (1) optionally transition the mobile sensory device 114-1 from a lower energy consumption state to a higher energy consumption state; (2) provide the alert notification to the feedback component 318 to provide feedback (e.g., visual feedback, an auditory feedback, haptic feedback) via the acoustic output component 380, haptic component 382, and/or visual indicator component 386; and/or (3) transition the mobile sensory device 114-1 from the previously higher-energy consumption state to the lower-energy consumption state.

In an embodiment and based on cumulative device activity information, the management component 314 may also be configured to detect non-movement of the mobile sensory device 114 for a specific unit of time (e.g., 5 seconds, 10 seconds, 30 seconds, etc.), i.e., the mobile sensory device 114-1 remains stationary for the specific unit of time. In response to the detection of non-movement, the mobile sensory device 114-1 may be configured to: (1) disconnect from any connected mobile device or ARED; and/or (2) optionally transition the mobile sensory device 114-1 from a higher energy consumption state to a lower energy consumption state, when the mobile sensory device 114-1 was previously in a higher-energy consumption state in order to reduce power consumption from the internal power component 390.

In an embodiment, the activity component 316 may be generally to assist in performing passive tracking operations. To assist in passive tracking operations, the activity component 316 may be configured to: (1) retrieve or otherwise receive motion information from the motion component 276 and orientation information from the orientation component 278; and (2) generate device activity information for the mobile sensory device 114-1 based on the motion information and orientation information. The generated device activity information may be temporarily and cumulatively stored in the sensory device datastore 350 of memory 370 as time series data and retrieved by the management component 314 for transmission to a mobile device and/or ARED.

In an embodiment, the feedback component 318 may be generally configured to provide visual feedback, auditory feedback, and/or haptic feedback, in response to an alert notification. In an embodiment, the mobile sensory device 114-1 may be configured to receive the alert notification transmitted from a mobile device or ARED, when the mobile device or ARED determines and/or predicts that a follower device (e.g., mobile sensory device 114-1) is no longer within physical proximity of the designated lead device (e.g., mobile device 102) for a particular tethered segment (e.g., tethered segment 118-1).

Figure 4:
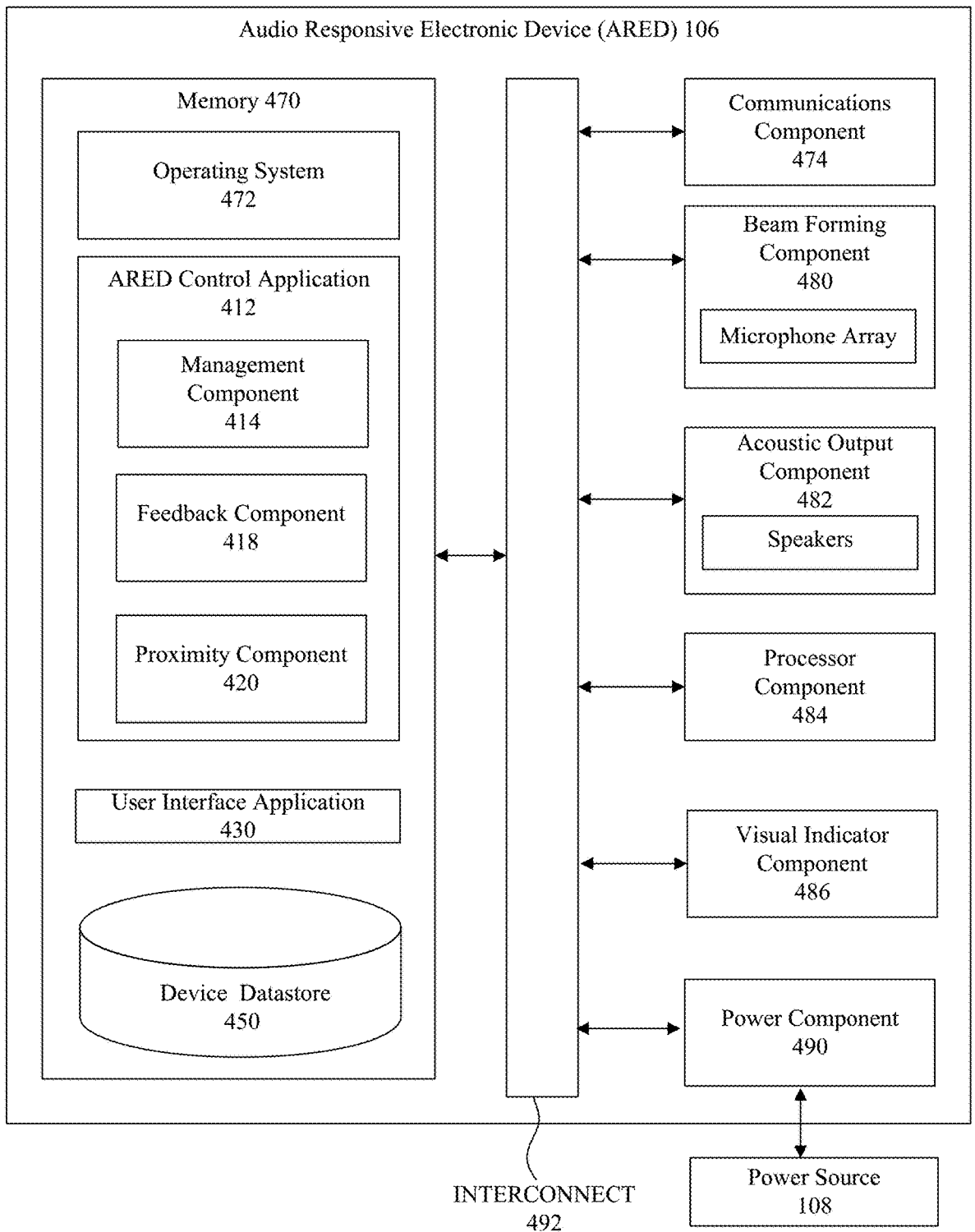
FIG. 4 illustrates components of an audio responsive electronic device (ARED) according to some embodiments.

FIG. 4 illustrates a block diagram of an example embodiment of the ARED 106. It is to be appreciated that while FIG. 4 illustrates one example embodiment of the ARED 106, the example embodiment is not limited to this context.

In an embodiment, the ARED 106 may be generally configured to receive acoustic input in the form of audio commands (e.g., verbal, spoken, etc.) from a user or another source of audio commands (such as but not limited to the audio of content output by speakers of display device (not shown)). In response, the ARED 106 may be configured to transmit control signals corresponding to such audio commands to various devices that may be connected to the network 150 such as one or more media device(s) (e.g., Roku® Streaming Stick®, Amazon® Fire TV®, Google®, Chrome Cast®, etc.)(not shown), display device(s) (e.g., Samsung® Smart TV® display devices, LG® WebOS® display devices, etc.)(not shown), digital assistant(s) (e.g., Amazon® Echo®/Alexa®, Apple® iPhone®/Siri®, Microsoft®/Cortana®, Google Home®/Google Assistant®) (not shown) and/or any other device in mobile sensory system 100, to cause the one or more media device(s), display device(s), digital assistant(s) and/or other component to operate according to the audio commands.

In an embodiment, the ARED 106 may also be configured to assist in the physical proximity tracking of one or more mobile devices (e.g., mobile device 102, etc.) and/or mobile sensory devices (e.g., mobile sensory device 114-1, 114-2, 114-3, etc.) in a local area or fixed area such as a business office and/or home residence. In an embodiment, the device may include, but is not limited to, memory 470, communications component 474, beam forming component 480, acoustic output component 482, processor component 484, visual indicator component 486, power component 490, where each of the components and memory 270 may be operatively connected via interconnect 492.

In an embodiment, the memory 470 may be generally arranged to store information in volatile and/or nonvolatile memory, which may include, but is not limited to, the memory previously discussed with respect to memory 270, memory 370, and/or any other type of storage media configured for storing information. In an embodiment and similar to memory 270 and memory 370, the memory 470 may include instruction information arranged for execution by the processor component 484. In that embodiment, the instruction information may be representative of at least one operating system 472, one or more applications, which may include, but is not limited to, ARED control application 412. In an embodiment, the memory 470 may further include device datastore 450 which may be configured to store device configuration information further illustrated in FIG. 5A, device activity information further illustrated in FIG. 5B, and device user information further illustrated in FIG. 5C.

In an embodiment, the operating system 472 may be generally arranged to manage a limited set of hardware resources (e.g., one or more components of the mobile sensory device 114-1, etc.) and/or software resources (e.g., one or more applications of the mobile sensory device 114-1, etc.). In an embodiment, the operating system 472 may include, without limitation, light weight real-time embedded operating systems such as those discussed with respect to mobile sensory device 114-1. Alternatively, the operating system 472 may include, without limitation, mobile operating systems such as those discussed with respect to mobile operating system 272 of mobile device 102.

In an embodiment, the communications component 474 may be generally arranged to enable the ARED 106 to communicate, directly and/or indirectly, with various devices (e.g., mobile device 102, mobile sensory device 114-1, 114-2, Mail Transfer Agents (MTA) (not shown), Short Messaging Service (SMS) servers (not shown), etc.) in the mobile sensory system 100. In an embodiment, the communications component 474 may include, among other elements, a radio frequency circuit (not shown) configured for encoding and/or decoding information and receiving and/or transmitting the encoded information as radio signals in frequencies consistent with the one or more wireless communications standards (e.g., Bluetooth, Wireless IEEE 802.11, WiMAX IEEE 802.16, Global Systems for Mobile Communications (GSM), Enhanced Data Rates for GSM Evolution (EDGE), Long Term Evolution (LTE), Bluetooth standards, Near Field Communications (NFC) standards, etc.).

In an embodiment, the beam forming component 480 may be generally arranged for converting sound, vibrations, or any other mechanical waves received by the ARED 106 into digital or electronic signals representative of acoustic input information. To convert these mechanical waves into acoustic input information, the beam forming component 480 may be configured to utilize one or more acoustic sensors (e.g., microphones, etc.), which may be located or positioned on or within the housing, case, or enclosure of the ARED 106 to form an microphone array.

In an embodiment, the acoustic output component 482 may be generally arranged to receive acoustic output information and convert the received acoustic output information into electronic signals to output sound, vibrations, or any other mechanical waves. To convert the received acoustic output information to mechanical waves, acoustic output component 482 may utilize the one or more electroacoustic transducers (e.g., speakers, etc.) which may be located or positioned on or within the housing, case, or enclosure of the ARED 106.

In an embodiment, the processor component 484 may be generally arranged to execute instruction information including one or more instructions. In an embodiment, the processor component 484 may be an embedded processor component or system-on-chip (SoC) processor component which may comprise, among other elements, processor circuit, which may include, but is not limited to, at least one set of electronic circuits arranged to execute one or more instructions. Additionally or alternatively, the processor component 484 may be an embedded microcontroller component or mobile processor component arranged to execute the one or more instructions.

In an embodiment, the visual indicator component 486 may be generally arranged to receive and present visual display information. Moreover, the visual indicator component 386 may include, among other elements, micro-display device (e.g., liquid-crystal display, light-emitting diode display, organic light-emitting diode display, etc.) and/or one or more light-emitting diodes and/or organic light-emitting diodes mounted on the surface of the ARED 106 to provide visual feedback.

In an embodiment, the power component 490 may be generally arranged to provide power to the various components and the memory of the ARED 106. In an embodiment, the internal power component 490 may include and/or be operatively coupled to an internal and/or external battery configured to provide power to the various components (e.g., processor component 484, communications component 474, memory 470, etc.). Additionally or alternatively, the power component 490 may receive and/or store power provided by a power source 108 such as, for example, a power outlet.

In an embodiment, the user interface application 430 may be generally configured to process audio commands received from a user or another source of audio commands (such as but not limited to the audio of content output by speakers of display device (not shown)). In response, the ARED 106 may be configured to convert the processed audio commands and generate control signals based on the processed audio commands that are specifically adapted for the control of one or more media device(s), display device(s), digital assistant(s), and/or any other device that may be in mobile sensory system 100. Additionally, the ARED 106 may transmit control signals corresponding to such audio commands to various devices that may be connected to the network 150.

In an embodiment, the ARED control application 412 may be generally configured to perform active tracking operations that actively assist in tracking of various utility objects 112-b and/or mobile devices within a limited geographical area surrounding the ARED 106. The limited geographical area may include a local area network 150, which may include, without limitation, geographical area surrounding a business office, home residence, or any other limited geographical area that is typically reachable by the local area network 150. In an embodiment, the ARED control application 412 may include, without limitation, a management component 414, a feedback component 418, and a proximity component 420.

In an embodiment and to perform active tracking operations, the management component 414 may be generally configured to: (1) communicate with the one or more mobile sensory devices 114-b and/or mobile devices; and (2) request and/or receive device activity information generated by an activity component of a respective mobile sensory device (e.g., activity component 316 of mobile sensory device 114-1) and/or mobile devices (e.g., activity component 216 of mobile devices) within a tethered segment.

In an embodiment, the feedback component 418 may be generally configured to provide visual feedback, auditory feedback, and/or haptic feedback, in response to an alert notification. In an embodiment, the proximity component 220 may generate the alert notification, when the proximity component 420 determines and/or predicts that a follower device is no longer within physical proximity of the designated lead device within the tethered segment.

In an embodiment, the proximity component 420 may be generally configured to assist the ARED 106 in performing active tracking operations. To perform active tracking operations, the proximity component 420, for each tethered segment (e.g., tethered segment 118-1, 118-2, etc.), may be generally arranged to: (1) determine that at least one device (e.g., mobile sensory device 114-1, 114-2, etc.) for a tethered segment is not within a limited geographical area surrounding the ARED 106; and (2) determine that at least one other device (e.g., mobile device 102) in the same tethered segment is within the limited geographical area surrounding the ARED 106. Additionally, the proximity component 420, for each tethered segment (tethered segment 118-1, 118-2, etc.), may be also generally arranged to predict whether all devices currently within limited geographical area surrounding the ARED 106 will also remain or leave the physical proximity of each other. Each of these operations will be further discussed below in turn and in the order discussed above.

In an embodiment, the proximity component 420 may be configured to determine whether a follower device (e.g., mobile sensory device 114-1, 114-2, etc.) and a designated lead device (e.g., mobile device 102) is within the physical proximity of each other in a limited geographical area surrounding the ARED 106. To perform the above determinations, the proximity component 420 may be configured to poll the one or more follower devices and/or the designated lead device via wireless connections and/or protocols on a local area network (e.g., Bluetooth standards, 802.11 wireless standards, etc.). In an embodiment, and to poll the one or more follower devices, the proximity component 420 may be further configured to determine whether each of the follower devices and the designated lead device within a tethered segment is network reachable via either direct peer-to-peer wireless connections to the one or more devices or network reachable via local area network connection of the ARED 106. Additionally or alternatively and to poll the one or more devices, the proximity component 420 may be configured to request device activity information generated by the activity component (e.g., activity component 216 of FIG. 2 and activity component 316 of FIG. 3) from the one or more devices.

In an embodiment and for each tethered segment (e.g., tethered segment 118-1, 118-2, etc.), the proximity component 420 may be configured to determine that at least one follower device (e.g., mobile sensory device 114-1, 114-2, etc.) and/or a designated lead device (e.g., mobile device 102) is not within a limited geographical area surrounding the ARED 106. Additionally, the proximity component 420 may also be configured to determine that at least one other follower device (e.g., mobile sensory device 114-1, 114-2, etc.) and/or the designated lead device (e.g., mobile device 102) are within the limited geographical area surrounding the ARED 106.

Thus, in the embodiment above, the proximity component 420 may determine that a first device is not within the limited geographical area surrounding ARED 106 and also determine that a second device is within limited geographical area surrounding ARED 106. This allows the proximity component 420 to determine that the first device for a tethered segment is outside of the approximate physical proximity of the second device in the same tethered segment, which may indicate that the user has forgotten a utility object.

For example, the proximity component 420 may be configured to determine that a mobile sensory device 114-1 of tethered segment 118-1 is within the physical proximity of ARED 106, when the proximity component 420 may ping or otherwise communicate with both the follower device and the designated lead device via a direct peer-to-peer wireless connection or the local area network connection of the ARED 106. Similarly, the proximity component 420 may be configured to determine that the mobile sensory device 114-2 may not be within physical proximity of the ARED 106 for a specific unit of time, when the proximity component 420 is unable to ping or otherwise unable to communicate with the mobile sensory device 114-2 via a direct peer-to-peer wireless connection or the local area network connection of the ARED 106 for a specific communication timeout period (e.g., 5 seconds, 10 seconds, 30 seconds, 60 seconds, etc.). This may indicate that the mobile sensory device 114-2 attached to utility object 112-2 may have traveled outside the approximate physical proximity of the mobile sensory device 114-1.

Additionally, the proximity component 420 may determine that all devices of a tethered segment are within physical proximity of the ARED 106 and therefore all devices are also within approximate physical proximity of each other, when the ARED 106 may communicate with each device within the tethered segment via one or more wireless connections and/or protocols on the local area network. Upon the above determination that all devices of a tethered segment are within substantial physical proximity of each other, the proximity component 420 may be further configured to predict whether one or more devices (e.g., mobile sensory devices 114-1, 114-2, etc.) will remain within or leave the physical proximity of a designated lead device (e.g., mobile device 102) within a tethered segment (e.g., tethered segment 118-1, etc.)

In an embodiment and to predict whether one or more follower devices (e.g., mobile sensory devices 114-1, 114-2, etc.) will remain within or leave the physical proximity of a designated lead device (e.g., mobile device 102) within a tethered segment (e.g., tethered segment 118-1, etc.), the proximity component 420 may be configured to: (1) receive device activity information from the one or more devices that are moving; (2) update the device activity information for each device stored in the device datastore 250 based on the received device activity datastore; and/or (3) poll the one or more devices, in response to determining that at least one device is moving based at least partially on the received device activity information.

In an embodiment and to predict whether one or more follower devices (e.g., mobile sensory devices 114-1, 114-2, etc.) will remain within or leave the physical proximity of a designated lead device (e.g., mobile device 102), the proximity component 420 may be configured to determine whether all devices within the tethered segment are moving at substantially the same time and/or substantially in the same direction. For example, the proximity component 420 may predict that a follower device such as mobile sensory electronic device 114-1 that is within the same tethered segment 118-1 as a designated lead device such as mobile device 102, will remain within physical proximity of the lead device, when the proximity component 420 determines that the mobile device 102 is moving substantially at the same time and/or in substantially the same direction as the mobile sensory device 114-1.

Continuing with the above example and to determine whether the mobile device 102 is moving substantially at the same time and/or substantially in the same direction as the mobile sensory device 114-1, the proximity component 420 may be configured to compare the past cumulative device activity information and most recent in time device activity information of the mobile device 102, (i.e., the lead device activity information) with the past cumulative device activity information and most recent in time device activity information of the at least one mobile sensory device such as mobile sensory devices 114-1 and 114-2 (i.e., the one or more follower device activity information). Continuing with the above example, and based on the analysis and comparison of the past cumulative and most recent in time device activity information, the proximity component 420 may be configured to determine that all devices within a tethered segment started moving at substantially same time, when the maximum time difference between a first device to transition from a non-moving state to a moving state and a last device to transition from a non-moving state to a moving state does not exceed a specific period of time (e.g., 500 milliseconds, one (1) second, etc.).

Based on the above prediction, determination, and the device configuration information, the proximity component 420 may also be configured to generate an alert notification. In an embodiment, the alert notification may be used by the feedback component 418 to provide auditory, haptic, and/or visual feedback. The feedback may notify the user of the mobile device 102 that one or more follower devices (e.g., mobile sensory device 114-1, 114-2, etc.) of a tethered segment (e.g., tethered segment 118-1) is not within approximate physical proximity of each other or predicted to not remain within the approximate physical proximity of each other. Additionally and based on the device configuration information, the alert notification may be transmitted to the at least one follower device (e.g., mobile sensory device 114-1 and/or 114-2) that did not move in substantially the same direction and/or at substantially the same time as mobile device 102.

FIG. 5A illustrates example device configuration information for mobile devices and/or mobile sensory devices that may be stored within the device datastore 250, device datastore 350, and device datastore 450 according to an example embodiment.

In an embodiment, the device configuration information for each mobile device and/or mobile sensory device may include, without limitation, user identifier that identifies a particular user (e.g., a unique identifier of alphanumeric characters, etc.) associated with the device, a device identifier that uniquely identifies the particular device (e.g., media access control (MAC) address, Electronic Serial Number (ESN), etc.)), a device type that identifies the device as a mobile device or a mobile sensory device, a segment identifier that identifies the tethered segment that the device is associated with (e.g., a unique identifier of alphanumeric characters, etc.), a leader/follower indicator that indicates whether the device is a designated lead device or a follower device within a tethered segment, and/or feedback indicator that identifies the types of feedback that is enabled for that particular device (e.g., audio feedback, haptic feedback, visual feedback, email feedback, message feedback, etc.).

For example and with respect to the device identifier, Device_ID_1 may be associated with and identify mobile device 102, Device_ID_2 may be associated with and identify mobile sensory device 114-1, Device_ID_3 may be associated with and identify mobile sensory device 114-2 and so forth. Continuing with the example and with respect to the segment identifier, Segment_ID_1 may be associated with and identify tether segment 118-1 which may include Device_ID_1, Device_ID_2, and Device_ID_3, which may all be associated with the user name John Doe having user identifier of USER_ID_1 as illustrated in combination with FIG. 5C.

FIG. 5B illustrates example device activity information for one or more mobile devices and/or mobile sensory devices that may be stored within the device datastore 250, device datastore 350, and device datastore 450 according to an example embodiment.

In an embodiment, the device activity information for each mobile device and/or mobile sensory device may include, without limitation, a device identifier that uniquely identifies the particular device, location information that identifies the approximate longitude and latitude coordinates associated with the device (when available), motion state that identifies whether the device is in a moving state or not moving or non-moving state, motion direction that identifies the approximate direction of the motion (e.g., North (N), South (S), East (E), West, (W), and combinations thereof such as North West (NW), North East (NE), South West (SW), South East (SE), etc.) and/or update timestamp that indicates the time that the device activity information was last updated by the mobile device 102 and/or ARED 106 for the device (e.g., mobile device 102, mobile sensory device 114-1, 114-2, etc.). Furthermore, in an embodiment, the device activity information stored in the various device datastores may be cumulated and/or aggregated as time series data where each update to the device activity information may include a corresponding update time stamp (e.g., UNIX time stamp in millisecond resolution as illustrated in FIG. 5B) and updated values for each of the one or more entries (i.e., time series device activity information).

FIG. 5C illustrates device user information for one or more mobile devices and/or ARED 106 that may be stored within the device datastore 250 and device datastore 450 according to an example embodiment.

In an embodiment, the device user information for each mobile device and/or mobile sensory device may include, without limitation, a user identifier that identifies a particular user (e.g., a unique identifier of alphanumeric characters, etc.) associated with the device, the user name associated with the user identifier, a phone number associated with the user identifier, and/or email address associated with the user identifier.

It is to be appreciated that by using device user information (e.g., user identifier, user name, phone number, email address, etc.) as well as segment identifier and device identifier, the various information (e.g., motions state, motion direction, device type, leader/follower, feedback, etc.) associated with device configuration information and/or device activity information for each device (e.g., mobile device, mobile sensory device, etc.), the one or more components (e.g., management components) of the mobile device, mobile sensory device, and/or ARED may efficiency determine various information by cross referencing with various identifiers (e.g., the segment identifier, device identifier, and user identifier).

Provided herein below are example processing operations that may be performed by one or more example embodiments. Although the processing operations may appear to be performed sequentially, it is to be appreciated that the processing operations may not be limited to the order as illustrated and/or described. Additionally, some processing operations may occur substantially simultaneously or contemporaneously with respect to other processing operations as will be further discussed below.

Figure 6A:
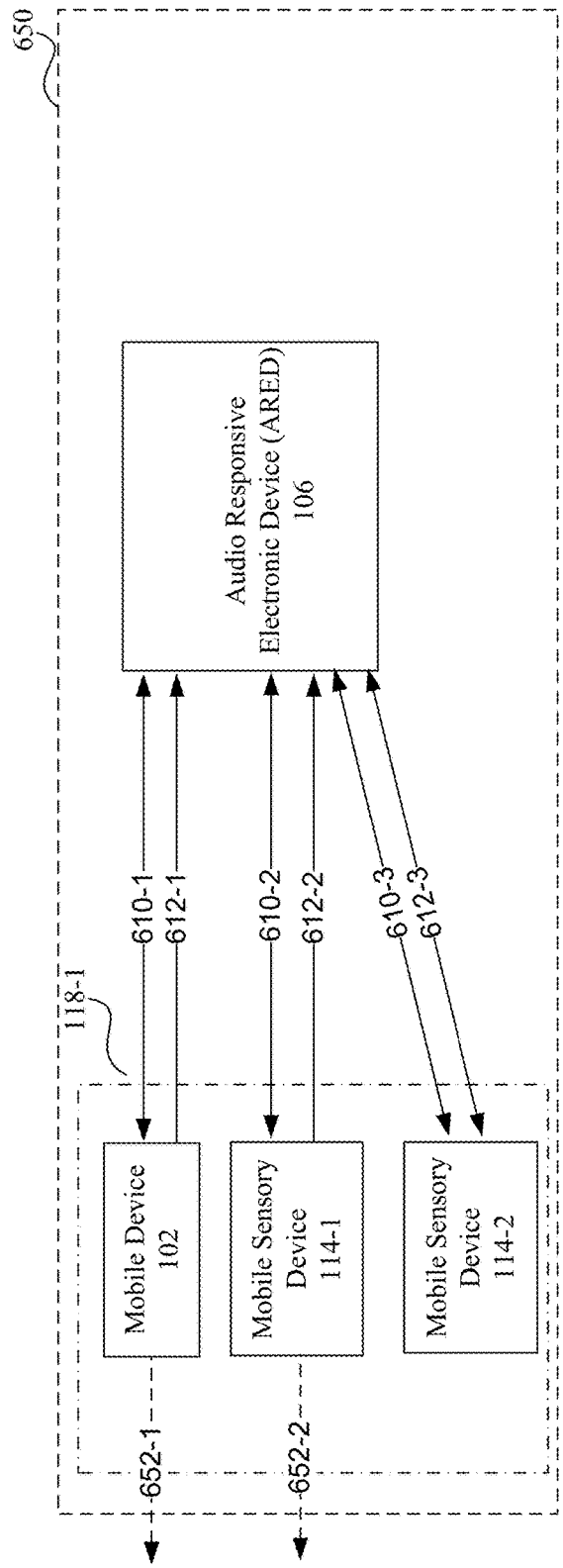
FIGS. 6A-6B illustrate example interactions between an ARED, mobile sensory devices, and a mobile device according to some embodiments.
Figure 6B:
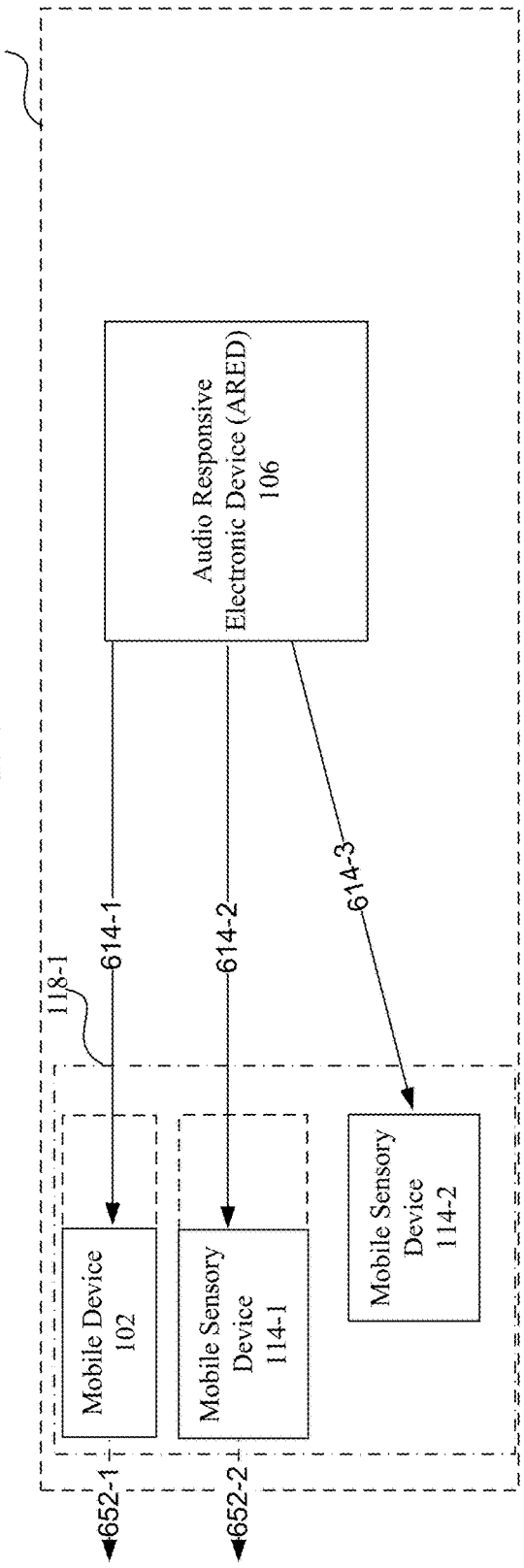

FIGS. 6A and 6B illustrate example processing operations an ARED may perform to actively track the approximate physical proximity of different devices of a tethered segment. In various embodiments of FIGS. 6A and 6B, the ARED may perform active tracking operations to determine and/or predict whether one or more devices within a tethered segment are within physical proximity of a designated lead device or will remain within or leave the physical proximity of the designated lead device according to example embodiments.

In the various embodiments of FIGS. 6A and 6B, the mobile device 102, the mobile sensory device 114-1, and the mobile sensory device 114-2 may be within the same tethered segment 118-1 and each of the devices may be within the predefined area 650 of the ARED 106 to facilitate wireless communications with the ARED 106 either directly or indirectly over a local area network associated with the ARED 106. In various embodiments of FIGS. 6A and 6B, the predefined area 650 may be representative of a limited or fixed geographical region such as a business office and/or home residence where each of the devices in the tethered segment 118-1 may communicate either directly or indirectly over a local area network associated with the ARED 106. Additionally and in various embodiments of FIGS. 6A and 6B, the mobile device 102 may be designated as a lead device and the mobile sensory devices 114-1 and 114-2 may be designated as follower devices. In various embodiments of FIGS. 6A and 6B, the mobile device 102 and the mobile sensory device 114-1 may begin to move as illustrated at stages 652-1 and 652-2 while the mobile sensory 114-2 may remain stationary.

In an embodiment and to determine whether devices in the tethered segment 118-1 are within the predefined area 650 of the ARED 106, the ARED 106 may be configured to poll the one or more follower devices and/or the designated lead device via wireless connections and/or protocols in the local area network of the ARED 106. In an embodiment, the ARED 106 may determine whether the mobile sensory devices 114-1 and 114-2 and the mobile device 102 are within predefined area 650 of the ARED 106, when the ARED 106 may communicate with each device in the tethered segment 118-1 via one or more wireless connections and/or protocols on the local area network.

In an embodiment, the ARED 106 may determine that the one or more devices such as the mobile device 102, mobile sensory device 114-1 and/or mobile sensory device 114-2 may not be within physical proximity of ARED 106, when the ARED 106 is unable to ping or otherwise unable to communicate with the one or more devices within a specific communication timeout period (e.g., five hundred (500) milliseconds, one (1) second, two (2) seconds, ten (10) seconds, etc.) In response to that determination, the ARED 106 may transmit one or more alert notifications to the one or more devices within the tethered segment 118-1 to indicate that the one or more devices are not within the tethered segment 118-1.

Alternatively and as illustrated in FIG. 6A at stages 610-1, 610-2, and 610-3, the ARED 106 may determine that the ARED 106 may communicate with the one or more devices such as the mobile device 102, mobile sensory device 114-1, and mobile sensory device 114-2 within the tethered segment 118-1. Assuming that the ARED 106 may communicate with each of the devices in tethered segment 118-1, at stages 610-1, 610-2, and 610-3, the ARED 106 may also optionally request and receive device configuration information from each device within the tethered segment 118-1. In response to receiving the device configuration information for one or more devices, the ARED 106 may also optionally update the device configuration information of the one or more devices stored in the device datastore 450. While not explicitly illustrated, it is to be appreciated that the one or more stages (e.g., stages 610-1, 610-2, and 610-3) may be performed substantially simultaneously or contemporaneously between the ARED 106 and various devices within the tethered segment 118-1. Additionally or alternatively, the one or more stages (e.g., stages 610-1, 610-2, and 610-3) may also be performed in any order.

In an embodiment and to predict whether each of the devices within the tethered segment 118-1 will remain within the tethered segment 118-1 when the one or more devices in the tethered segment 118-1 moves, the ARED 106 may determine whether the devices in the tethered segment 118-1 are moving substantially at the same time and/or substantially in the same direction. In an embodiment and at stages 612-1 and 612-2, both the mobile device 102 and the mobile sensory device 114-1 may transmit their respective device activity information to the ARED 106, when the mobile device 102 and the mobile sensory device 114-1 begin to move as indicated by stages 652-1 and 652-2. When mobile device 102 and the mobile sensory device 114-1 begin to move, both devices may transition from a non-motion state (i.e., not moving state as illustrated in FIG. 5B) to a motion state (e.g., moving state as illustrated in FIG. 5B) after detecting motion and/or acceleration by their respective activity components (e.g., activity components 216 and 316 as illustrated in FIGS. 2 and 3).

In an embodiment and at stages 612-1 and 612-2, the ARED 106 may also receive the device activity information transmitted from mobile device 102 and mobile sensory device 114-1. In response, the ARED 106 may also update the device configuration information of the mobile device 102 and mobile sensory device 114-1 stored in the device datastore 450. In an embodiment, the ARED 106 may wait for a specific update timeout period (e.g., two hundred fifty milliseconds (250), five hundred (500) milliseconds, one (1) second, etc.) after receiving device configuration information from the mobile device 102 or mobile sensory device 114-1 in order to provide sufficient time for the ARED 106 to receive device activity information generated and/or transmitted from the mobile sensory device 114-2.

Additionally at stage 612-3 and after waiting for the specific update timeout period, the ARED 106 may optionally request the device configuration information from mobile sensory device 114-2. Additionally at stage 612-3, the ARED 106 may optionally further wait for another specific communication timeout period to receive the device configuration information to be generated and/or transmitted from the mobile sensory device 114-2.

In an embodiment, and after waiting for one or more timeout periods discussed above, the ARED 106 may begin to determine whether all devices within the tethered segment 118-1 are moving substantially at the same time and substantially in the same direction for a minimum continuous movement period. In an embodiment and to determine whether the mobile device 102, mobile sensory device 114-1, and mobile sensory device 114-2 are moving together substantially at the same time and/or substantially in the same direction, the ARED 106 may compare the past cumulative device activity information starting with the most recent in time of mobile device 102, mobile sensory device 114-1, and mobile sensory device 114-2.

For example, the ARED 106 may compare past cumulative and most recent in time device activity information (e.g., past five (5) seconds from the most recent in time device activity information) received from the mobile device 102, (i.e., the lead device activity information) with the past cumulative and most recent device activity information (e.g., past five (5) seconds from the most recent in time device activity information) received from the one or more mobile sensory devices such as mobile sensory devices 114-1 and 114-2 (i.e., the one or more follower device activity information). Continuing with the example and in particular, the ARED 106 may compare at least the location information, motion state, and/or motion direction of the mobile device 102 with respect to the mobile sensory devices 114-1 and 114-2 to determine whether the mobile device 102, mobile sensory device 114-1, and mobile sensory device 114-2 are moving together.

In an embodiment and based on the comparison of the device activity information of mobile device 102 and mobile sensory device 114-1, the ARED 106 may determine that the mobile device 102 are in a substantially similar location, moving substantially at the same time, and moving substantially in the same direction as the mobile sensory device 114-1. As such, the ARED 106 may predict that mobile device 102 and mobile sensory devices 114-1 may remain within physical proximity of each other for a specific period of time (e.g., five (5) seconds, ten (10) seconds, thirty (30) seconds, sixty (60) seconds, etc.). However, based on the comparison of device activity information of the mobile device 102 and mobile sensory device 114-2, the ARED 106 may predict that mobile device 102 and mobile sensory device 114-2 may not remain within physical proximity of each other because they are not moving substantially at the same time or moving substantially in the same direction with respect to each other.

In an embodiment and after predicting that one or more devices (e.g., mobile sensory device 114-2) within the tethered segment 118-1 may not remain within physical proximity of each other, then at stages 614-1, 614-2, and 614-3, the ARED 106 may transmit one or more alert notifications to the one or more devices in the tethered segment 118-1. In some embodiments, the ARED 106 may transmit one or more alert notifications to the only the moving devices or the only non-moving (e.g., stationary) devices. For example, the ARED 106 may transmit the alert notifications to only mobile device 102 and mobile sensory device 114-1 or only the non-moving devices such as only mobile sensory device 114-2.

Additionally or alternatively, the ARED 106 itself may provide at least one feedback to the user. The at least one feedback provided by ARED 106 may notify the user near the physical proximity of the ARED 106 that the mobile sensory device 114-2 of tethered segment 118-1 which is currently within the physical proximity of ARED 106 may not remain within the physical proximity of other devices (e.g., mobile device 102 and mobile sensory device 114-1).

In an embodiment, the at least one feedback provided by the ARED 106 may include visual feedback in the form of light emitted in one or more patterns from the one or more light-emitting diodes (LED) and/or organic light-emitting diodes (OLED) mounted on the housing or surface of the ARED 106. In an embodiment, the at least one feedback provided by the ARED 106 may also include audio feedback in the form series of acoustic tones (e.g., square wave, sinusoidal wave, saw tooth wave, etc.) at a specific frequency (e.g., 10 kHz, 15 kHz, etc.) with specific volume (e.g., ten (10) decibels, twenty (20) decibels, etc.), with a specific duration (e.g., one (1) second, two (2) seconds, etc.).

Additionally or alternatively, the audio feedback provided by ARED 106 may further include voice feedback. In an embodiment, the voice feedback may notify the user in a specific language (e.g., English, French, German, etc.) with specific volume (e.g., ten (10) decibels, twenty (20) decibels, etc.) that a mobile sensory device (e.g., mobile sensory device 114-2) is not or may not remain in the physical proximity of the other devices in the same tethered segment (e.g., mobile device 102 and mobile sensory device 114-2 of tethered segment 118-1). The voice feedback may also identify the specific device (e.g., identify mobile sensory device 114-2 as "a Utility Object of John Doe") that is not or will not remain in the physical proximity of the other devices.

Figure 7B:
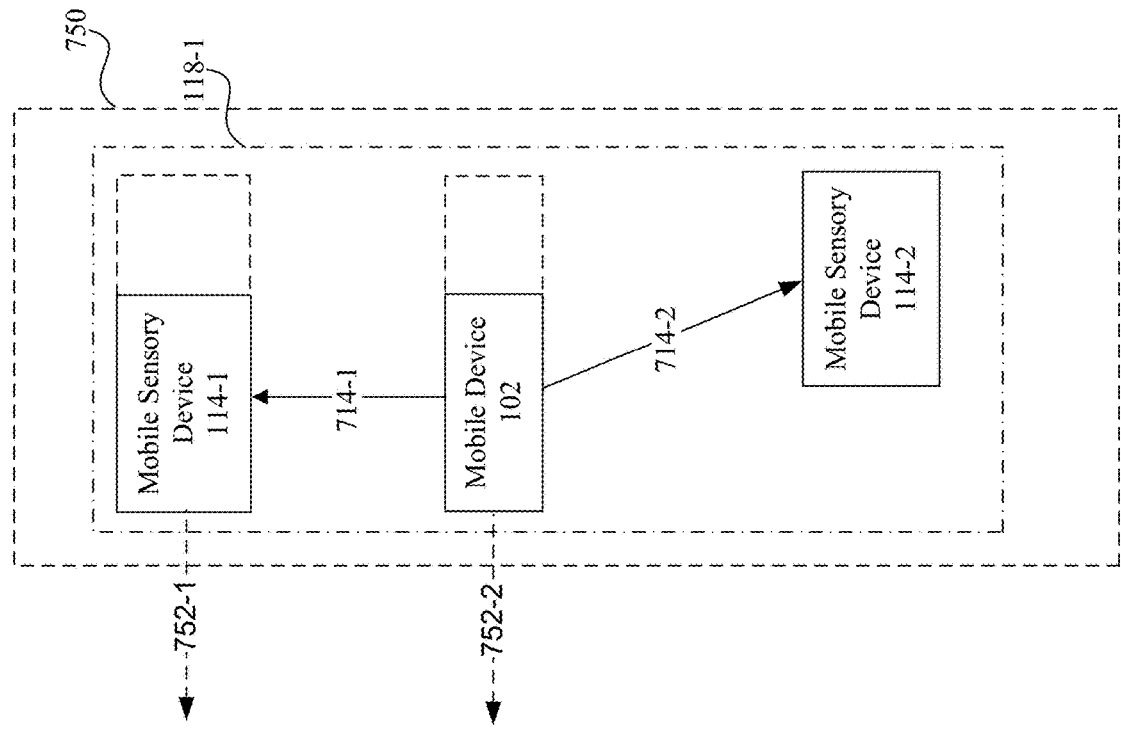
FIGS. 7A-7B illustrate example interactions between mobile sensory devices and a mobile device according to some embodiments.
Figure 7A:
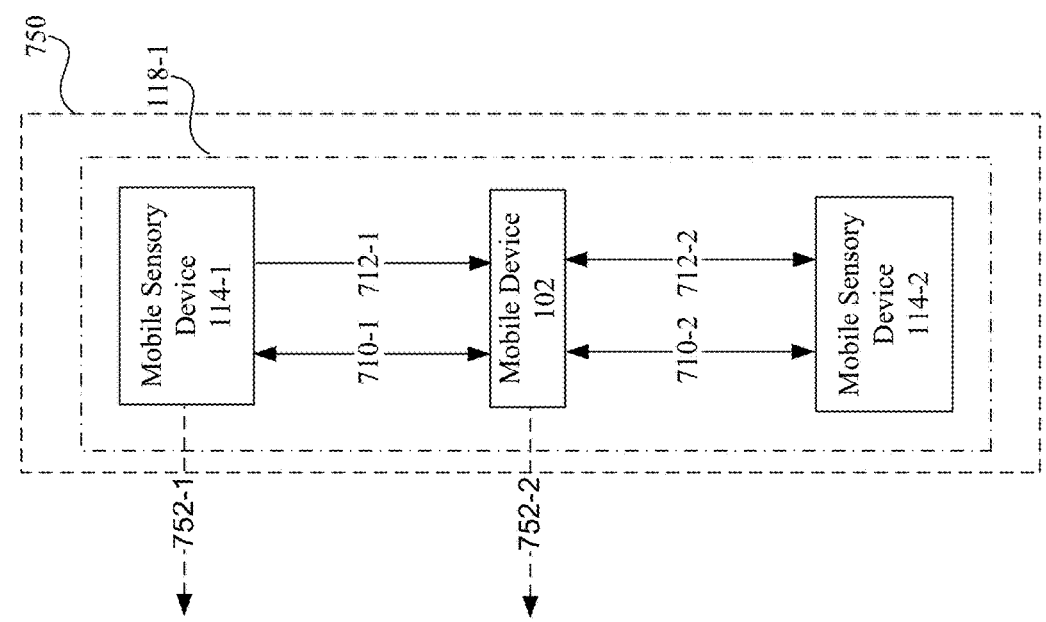

FIGS. 7A and 7B illustrate example process operations performed by a mobile device to actively track physical proximity of different devices of a tethered segment. In various embodiments of FIGS. 7A and 7B, the mobile device, which may be a designated lead device, may perform active tracking operations to determine and/or predict whether one or more devices within a tethered segment are within physical proximity of the designated lead device or will remain within or leave the physical proximity of the designated lead device according to example embodiments.

In the various embodiments of FIGS. 7A and 7B, the mobile device 102, the mobile sensory device 114-1, and the mobile sensory device 114-2 may all be within the same tethered segment 118-1 and each of the mobile sensory devices may be within the predefined area 750 of mobile device 102 to facilitate wireless communications with the mobile device 102 either directly or indirectly over a local area network associated with the mobile device 102. In various embodiments of FIGS. 7A and 7B, the predefined area 750 may be representative of a limited or fixed geographical region surrounding the mobile device 102 where each of the mobile sensory devices in the tethered segment 118-1 may communicate either directly or indirectly over the local area network associated with the mobile device 102. Additionally and in various embodiments of FIGS. 7A and 7B, the mobile device 102 may be designated as a lead device and the mobile sensory devices 114-1 and 114-2 may be designated as follower devices. In various embodiments of FIGS. 7A and 7B, the mobile device 102 and the mobile sensory device 114-1 may begin to move as illustrated at stages 752-1 and 752-2 while the mobile sensory 114-2 may remain stationary.

In an embodiment and to determine whether devices in the tethered segment 118-1 are within the predefined area 750 of the mobile device 102, the mobile device 102 may be configured to poll the one or more follower devices via wireless connections and/or protocols in the local area network associated with the mobile device 102. In an embodiment, the mobile device 102 may determine whether the mobile sensory devices 114-1 and 114-2 are within predefined area 750 of the mobile device 102, when the mobile device 102 may communicate with each device in the tethered segment 118-1 via one or more wireless connections and/or protocols on the local area network.

In an embodiment, the mobile device 102 may determine that the one or more devices such as the mobile sensory device 114-1 and/or mobile sensory device 114-2 may not be within physical proximity of the mobile device 102, when the mobile device 102 is unable to ping or otherwise unable to communicate with the one or more devices within a specific communication timeout period (e.g., five hundred (500) milliseconds, one (1) second, two (2) seconds, ten (10) seconds, etc.) In response to that determination, the mobile device 102 may transmit one or more alert notifications to the one or more devices within the tethered segment 118-1 to indicate that the one or more devices are not within the tethered segment 118-1. Additionally or alternatively, the mobile device 102 itself may provide at least one feedback to the user to indicate that the one or more devices are not currently within the tethered segment 118-1.

Alternatively and as illustrated in FIG. 7A at stages 710-1 and 710-2, the mobile device 102 may determine that the mobile device 102 may communicate with the one or more devices such as the mobile sensory device 114-1 and mobile sensory device 114-2 within the tethered segment 118-1. Assuming that the mobile device 102 may communicate with each of the devices in tethered segment 118-1, at stages 710-1 and 710-2 the mobile device 102 may also optionally request and receive device configuration information from each device within the tethered segment 118-1. In response to receiving the device configuration information for one or more devices, the mobile device 102 may also optionally update the device configuration information of the one or more devices stored in the device datastore 250. While not explicitly illustrated, it is to be appreciated that the one or more stages (e.g., stages 710-1 and 710-2) may be performed substantially simultaneously or contemporaneously between the mobile device 102 and various devices within the tethered segment 118-1. Additionally or alternatively, the one or more stages (e.g., stages 710-1 and 710-2) may also be performed in any order.

In an embodiment and to predict whether each of the devices within the tethered segment 118-1 will remain within the tethered segment 118-1 when the one or more devices in the tethered segment 118-1 moves, the mobile device 102 may determine whether all devices in the tethered segment 118-1 are moving substantially at the same time and/or substantially in the same direction. In an embodiment and at stage 712-1, the mobile sensory device 114-1 may transmit its device activity information to the mobile device 102, when the mobile sensory device 114-1 begins to move as indicated at stage 752-1. When this mobile sensory device 114-1 begins to move, the device may transition from a non-motion state (e.g., not moving) to a motion state (e.g., moving) after detecting motion and/or acceleration by its activity component (e.g., activity component 316 as illustrated in FIG. 3).

In an embodiment at stage 712-1, the mobile device 102 may also receive the device configuration information transmitted from the mobile sensory device 114-1. In response, the mobile device 102 may also update the device configuration information of the mobile sensory device 114-1 stored in the device datastore 450. Additionally and in response to detecting movement (e.g., detecting movement 752-2 of the mobile device 102), the mobile device 102 may also update its device activity information stored in the device datastore 250.

In an embodiment, the mobile device 102 may wait for a specific update timeout period (e.g., two hundred fifty milliseconds (250), five hundred (500) milliseconds, one (1) second, etc.) after receiving device configuration information from the mobile sensory device 114-1 in order to provide sufficient time for the mobile device 102 to receive device activity information generated and/or transmitted from the mobile sensory device 114-2.

Additionally at stage 712-2 and optionally and after waiting for the specific update timeout period, the mobile device 102 may optionally request the device configuration information from mobile sensory device 114-2. Additionally at stage 712-2, the mobile device 102 may optionally further wait for another specific communication timeout period to receive the device configuration information to be generated and/or transmitted from the mobile sensory device 114-2.

In an embodiment, and after waiting for one or more timeout periods discussed above, the mobile device 102 may begin to determine whether all devices within the tethered segment 118-1 are moving substantially at the same time and/or substantially in the same direction. In an embodiment and to determine whether each of the mobile device 102, mobile sensory device 114-1, and mobile sensory device 114-2 are moving together substantially at the same time and/or substantially in the same direction, the mobile device 102 may compare the past cumulative and most recent in time device activity information (e.g., past five (5) seconds starting with the most recent in time device activity information) of mobile device 102, mobile sensory device 114-1, and mobile sensory device 114-2.

For example, the mobile device 102 may compare the past cumulative and most recent in time device activity information of the mobile device 102, which may be the designated lead device, with the past cumulative and most recent in time device activity information of the one or more mobile sensory devices such as mobile sensory devices 114-1 and 114-2. Continuing with the example and in particular, the mobile device 102 may compare at least the location information, motion state, and/or motion direction of the mobile device 102 with respect to the mobile sensory devices 114-1 and 114-2 to determine whether the mobile device 102, mobile sensory device 114-1, and mobile sensory device 114-2 are moving together.

In an embodiment and based on the comparison of device activity information of mobile device 102 and mobile sensory device 114-1, the mobile device 102 may determine that the mobile device 102 is in a substantially similar location, moving substantially at the same time, and/or moving substantially in the same direction as the mobile sensory device 114-1. As such, the mobile device 102 may predict that mobile device 102 and mobile sensory devices 114-1 may remain within physical proximity of each other for a specific period of time (e.g., five (5) seconds, ten (10) seconds, thirty (30) seconds, sixty (60) seconds, etc.). However, based on the comparison of device activity information of the mobile device 102 and mobile sensory device 114-2, the mobile device 102 may predict that the mobile device 102 and mobile sensory device 114-2 may not remain within physical proximity of each other because they are not moving substantially at the same time or moving substantially in the same direction with respect to each other.

In an embodiment and after predicting that one or more devices (e.g., mobile sensory device 114-2) within the tethered segment 118-1 may not remain within physical proximity of each other, then at stages 714-1 and 714-2, the mobile device 102 may transmit one or more alert notifications to the one or more devices in the tethered segment 118-1. In some embodiments, the mobile device 102, like the ARED 106 discussed in FIGS. 6A and 6B, may transmit one or more alert notifications to the only the moving devices or only the non-moving (e.g., stationary) devices.

Additionally, the mobile device 102 itself may also provide at least one feedback to the user. The at least one feedback provided by mobile device 102 may notify the user near the physical proximity of the mobile device 102 that the mobile sensory device 114-2 in tethered segment 118-1 may not remain within physical proximity with mobile device 102 and mobile sensory device 114-1.

In an embodiment, the at least one feedback provided by the mobile device 102 may include visual feedback in the form alert messages (e.g., alert messages in the form of an email, mobile text, dialog box, notifications, etc.) that may be displayed on the display device of the mobile device 102. In an embodiment, the at least one feedback provided by the mobile device 102 may also include audio feedback in the form series of acoustic tones (e.g., square wave, sinusoidal wave, saw tooth wave, etc.) at a specific frequency (e.g., 10 kHz, 15 kHz, etc.) with specific volume (e.g., ten (10) decibels, twenty (20) decibels, etc.), with a specific duration (e.g., one (1) second, two (2) seconds, etc.).

Additionally or alternatively, the audio feedback provided by the mobile device 102 may further include voice feedback. In an embodiment, the voice feedback may notify the user in a specific language (e.g., English, French, German, etc.) with specific volume (e.g., ten (10) decibels, twenty (20) decibels, etc.) that a mobile sensory device (e.g., mobile sensory device 114-2) is not or will not remain in the physical proximity of other devices in the same tethered segment (e.g., mobile device 102 and mobile sensory device 114-2 of tethered segment 118-1). The voice feedback may also identify the specific device (e.g., identify mobile sensory device 114-2 as "a Utility Object of John Doe") that is not or will not remain in the physical proximity of the other devices.

Figure 8A:
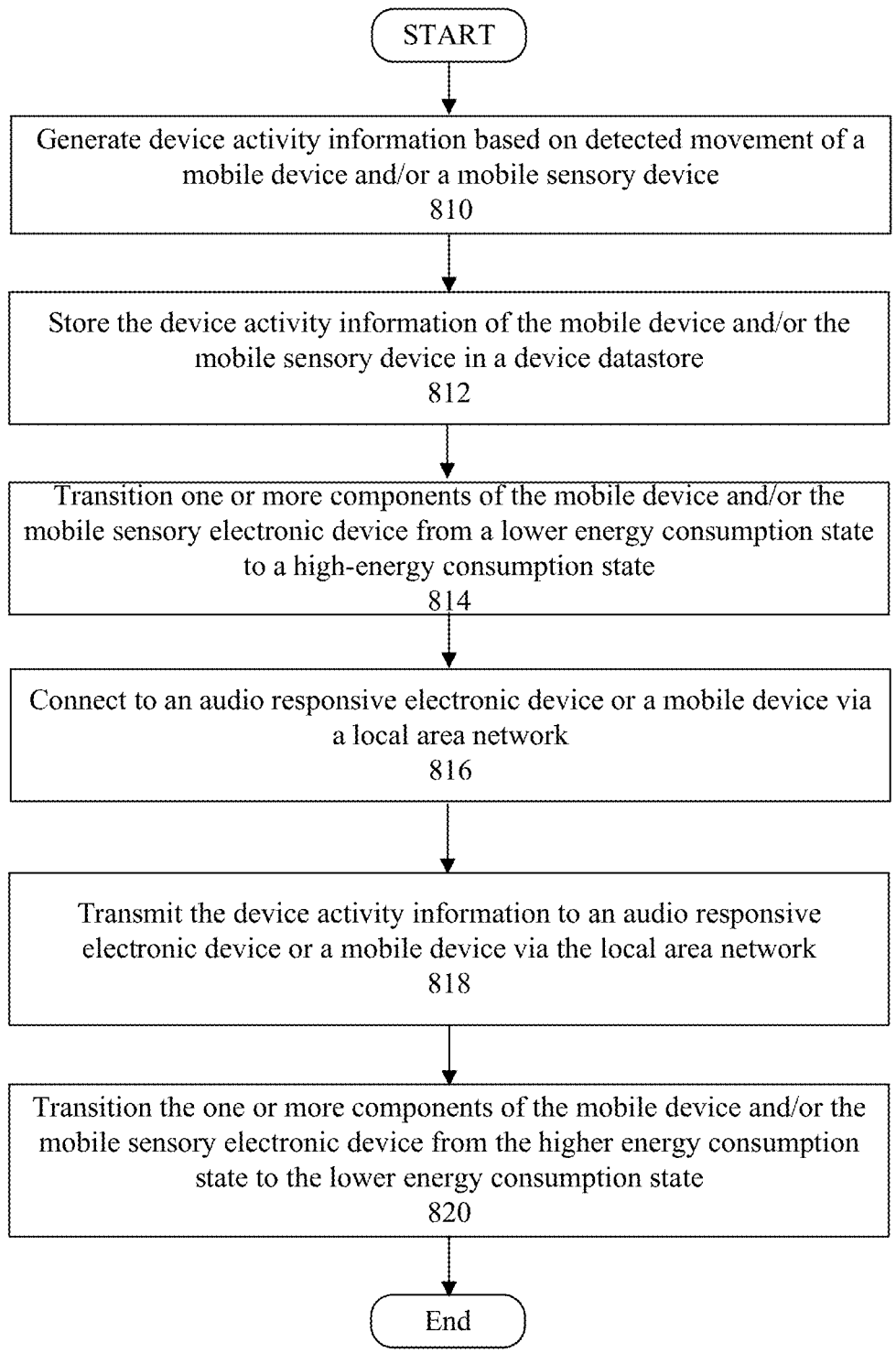

FIG. 8A illustrates example passive tracking operations that may be performed by a mobile device and/or a mobile sensory device when the mobile device and/or the mobile sensory device detects movement. It is to be appreciated that the mobile device and/or the mobile sensory device may perform the stages of FIG. 8A substantially in parallel or simultaneously with respect to some or all stages further disclosed with respect to FIGS. 8B and 8C.

At stage 810, the activity component (e.g. activity component 216 and/or 316) of a mobile device and/or mobile sensory device (e.g., mobile device 102 and/or mobile sensory device 114-1) may generate device activity information based on detected movement of a mobile device and/or a mobile sensory device. At stage 812, the activity component (e.g. activity component 216 and/or 316) of a mobile device and/or mobile sensory device (e.g., mobile device 102 and/or mobile sensory device 114-1) may store the device activity information of the mobile device and/or the mobile sensory device in a device datastore (e.g., device datastore 250 and/or 450).

At stage 814, the management component (e.g., management component 214 and/or 4314) of the mobile device and/or the mobile sensory device (e.g., mobile device 102 and/or mobile sensory device 114-1) may transition one or more components (e.g., mobile processor component 284, embedded processor component 384, communications component 274, communications component 374, etc.) from a lower energy consumption state (e.g., a low-power state, etc.) to a higher energy consumption state (e.g., working state, etc.), in response to the detection of movement by the activity component. At stage 816, the management component (e.g., management component 214 and/or 314) of the mobile device and/or the mobile sensory device (e.g., mobile device 102 and/or mobile sensory device 114-1) may connect to an ARED or a mobile device via a local area network.

At stage 818, the management component (e.g., management component 214 and/or 314) of the mobile device and/or the mobile sensory device (e.g., mobile device 102 and/or mobile sensory device 114-1) may transmit the device activity information to an ARED or a mobile device via the local area network. At stage 820, the management component (e.g., management component 214 and/or 414) of the mobile device and/or the mobile sensory device (e.g., mobile device 102 and/or mobile sensory device 114-1) may transition the one or more components of the mobile device or the mobile sensory electronic device from their previous higher energy consumption state to the lower energy consumption state.

FIG. 8B illustrates example processing operations that may be performed by a mobile device and/or a mobile sensory device to receive at least one alert notification from a mobile device and/or an ARED. It is to be appreciated that the mobile device and/or the mobile sensory device may perform the stages of FIG. 8B substantially in parallel or simultaneously with respect to some or all stages further disclosed with respect to FIGS. 8A and 8C.

At stage 830 and assuming that no connection already exists to a designated lead mobile device or an ARED, the management component (e.g., management component 214 and/or 314) of a mobile device and/or a mobile sensory device (e.g., mobile device 102 and/or mobile sensory device 114-1) may optionally connect to a mobile device (e.g., a designated lead mobile device) or an ARED via a local area network. At stage 832, the management component (e.g., management component 214 and/or 314) of a mobile device and/or a mobile sensory device (e.g., mobile device 102 and/or mobile sensory device 114-1) may receive at least one alert notification from the mobile device or the ARED.

At stage 834, the feedback component (e.g., feedback component 218 and/or 318) of a mobile device and/or a mobile sensory device (e.g., mobile device 102 and/or mobile sensory device 114-1) may activate at least one feedback to indicate to a user that at least one device within a tethered segment is not within a predefined area (e.g., a predefined area of a designated lead mobile device 102 or an ARED 106) and/or is predicted to not remain within the predefined area (e.g., the predefined area of a designated lead mobile device 102 or an ARED 106), in response to receiving the at least one alert notification.

It is to be appreciated that in instances where a tethered segment associated with a user may include at least two mobile devices, a follower mobile device generally performing passive tracking operations may receive the at least one alert notification from a designated lead mobile device while the designed lead mobile device performing active tracking operations may transmit the at least one alert notification to the follower mobile device so that the follower mobile device may provide appropriate feedback.

FIG. 8C illustrates example passive tracking operations that may be performed by a mobile device and/or a mobile sensory device to receive at least one device activity request for device activity information from a different mobile device (e.g., follower mobile device) and/or an ARED. It is to be appreciated that the mobile device and/or the mobile sensory device may perform the stages of FIG. 8C substantially in parallel or simultaneously with respect to some or all stages further disclosed with respect to FIGS. 8A and 8B.

At stage 850 and assuming that no connection already exists to a designated lead mobile device or an ARED, the management component (e.g., management component 214 and/or 314) of a mobile device and/or a mobile sensory device (e.g., mobile device 102 and/or mobile sensory device 114-1) may optionally connect to a mobile device (e.g., a designated lead mobile device) or an ARED via a local area network. At stage 852, the management component (e.g., management component 214 and/or 314) of a mobile device and/or a mobile sensory device (e.g., mobile device 102 and/or mobile sensory device 114-1) may receive a device activity request to retrieve device activity information.

At stage 854, the management component (e.g., management component 214 and/or 314) of a mobile device and/or a mobile sensory device (e.g., mobile device 102 and/or mobile sensory device 114-1) may retrieve the device activity information from the device datastore (e.g., device datastore 250 and/or 350). It is to be appreciated that the retrieved device activity information may include, without limitation, cumulative device activity information that includes the device activity information for a past specific period of time (e.g., past five (5) seconds) up to and including latest or most recent device activity which may be formatted as time series data.

At stage 856, the management component (e.g., management component 214 and/or 314) may transmit the retrieved device activity information to the requesting mobile device and/or ARED, in response to receiving the device activity request.

It is to be appreciated that in instances where a tethered segment associated with a user may include at least two mobile devices, a follower mobile device may receive a device activity request from a designated lead mobile device while the designed lead mobile device may transmit the device activity request to the follower mobile device so that the follower mobile device may provide the device activity information.

Figure 9A:
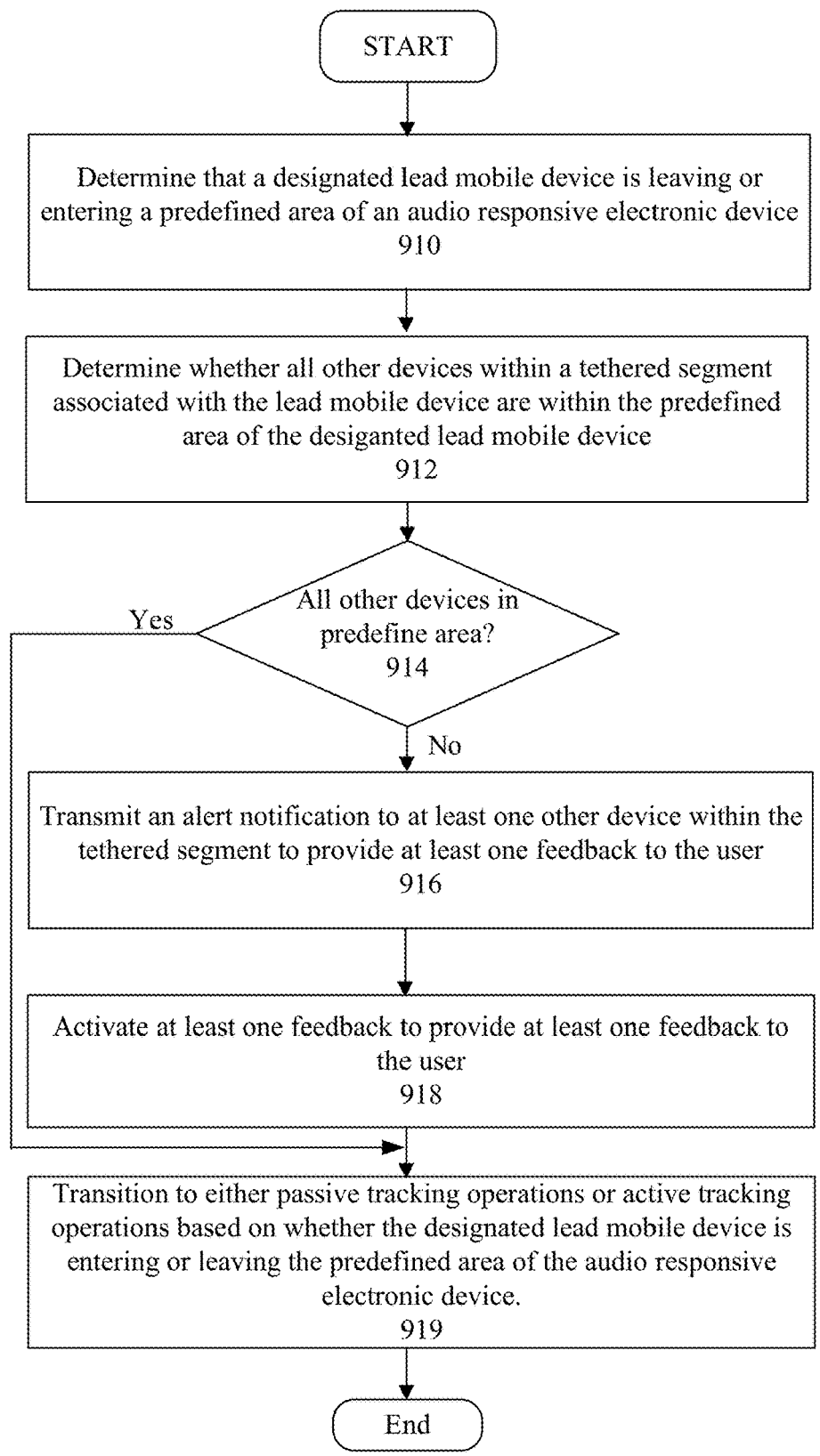

FIG. 9A illustrates example active tracking operations that may be performed by a designated lead mobile device when leaving and/or entering the physical proximity of an ARED in a local area network. It is to be appreciated that the designated lead mobile device may perform the stages of FIG. 9A substantially in parallel or simultaneously with respect to some or all stages further disclosed with respect to FIGS. 9B-9E.

At stage 910, the proximity component (e.g., proximity component 220) of a designated lead mobile device may determine that the designated lead mobile device (e.g., mobile device 102) is leaving and/or entering a predefined area of an ARED (e.g., ARED 106). For example, the designated lead mobile device may determine that it is entering the predefined area of the ARED 106, when the designated lead mobile device may wirelessly communicate with the ARED 106 via a local area network in a limited geographical area surrounding the ARED 106. Alternatively, the designated lead mobile device may determine that it is leaving the physical proximity of the ARED 106, when the designated lead mobile device may no longer wirelessly communicate with the ARED 106 via the local area network in a limited geographical area surrounding the ARED 106.

At stage 912, the proximity component (e.g., proximity component 220) of the designated lead mobile device may determine whether all other devices (e.g., mobile sensory device 114-1, mobile sensory device 114-2) of a tethered segment (e.g., tether segment 118-1) associated with the designated lead mobile device are within a predefined area of the designated lead mobile device (e.g., mobile device 102).

At stage 914 (illustrated as "Yes"), when the proximity component (e.g., proximity component 220) of a designated lead mobile device (e.g., mobile device 102) determines that all other devices (e.g., mobile sensory device 114-1 and mobile sensory device 114-2) are within the predefined area of the designated lead mobile device, the process may proceed to stage 919. This may indicate that the user who is in possession of their designated lead mobile device also has possession or is at least within physical proximity of all other devices within the tethered segment when entering or exiting the physical proximity of the ARED (e.g., ARED 106).

Alternatively at stage 914 (illustrated as "No"), when the proximity component (e.g., proximity component 220) of a designated lead mobile device (e.g., mobile device 102) determines that at least one other device (e.g., mobile sensory device 114-2) is not within predefined area of the designated lead mobile device (e.g., mobile device 102), then the process may proceed to stage 916.

At stage 916, the management component (e.g., management component 214) of a designated lead mobile device (e.g., mobile device 102) may transmit an alert notification to at least one other device (e.g., mobile sensory device 114-2) within the tethered segment (e.g., tether segment 118-1) to provide at least one feedback to the user.

Additionally in some implementations, the transmission of the alert notification to the at least one other device may be periodic (e.g., every one (1) second, every two (2) seconds, etc.) and/or continuous (e.g., continuously transmit for five (5) minutes for every two (2) seconds, etc.) to ensure that the at least one other device, which is not within the predefined area of the designated lead mobile device and/or may be out of communications range, receives at least one alert notification as soon as the designated lead mobile device moves within communication range. It is to be appreciated that by transmitting the alert notification to that at least one other device that is not within physical proximity and out of communication range of the designated lead mobile device, the user may easily locate the at least one other device that is not within the user's physical possession.

At stage 918, the feedback component (e.g., feedback component 218) of a designated lead mobile device (e.g., mobile device 102) may activate at least one feedback to provide at least one feedback to the user. The at least one feedback may further indicate to the user regarding the at least one other device that is not within the predefined area of the designated lead mobile device (e.g., mobile device 102).

At stage 919, the management component (e.g., the management component 214) of a designated lead mobile device (e.g., mobile device 102) may transition to either passive tracking operations or active tracking operations based on whether the designated lead mobile device is entering or leaving the physical proximity of the ARED. For example, the management component 214 may transition the designated lead mobile device 102 to perform passive tracking operations when entering physical proximity of the ARED 106 so that the ARED may begin to perform active tracking operations instead of the designated lead mobile device.

Alternatively, the management component 214 may transition the designated lead mobile device 102 to perform active tracking operations when leaving physical proximity of the ARED 106 so that the designated lead mobile device may begin to perform active tracking operations instead of the ARED 106.

FIG. 9B illustrates example active tracking operations that may be performed by a designated lead mobile device or an ARED to determine whether a device is within a predefined area, which may be a limited geographical area surrounding the designated lead mobile device or the ARED. In some implementations, a designated lead mobile device or an ARED may perform the stages of FIG. 9B substantially in parallel or simultaneously with respect to some or all stages further disclosed with respect to FIGS. 9A and 9C-9E. In other implementations and upon detecting movement with respect to at least one device of a tethered segment, a designated lead mobile device or an ARED may perform the stages of FIG. 9B.

At stage 920, the proximity component (e.g., proximity component 220 and/or 420) of a designated lead mobile device (e.g., mobile device 102) or an ARED (e.g., ARED 106) may determine whether all mobile devices and/or mobile sensory devices of at least one tethered segment tethered segment (e.g., tethered segment 118-1, 118-2, etc.) is within the designated lead mobile device's or the ARED's predefined area.

At stage 922 (illustrated as "Yes") and with respect to the designated lead mobile device, when the proximity component (e.g., proximity component 220) of the designated lead mobile device (e.g., mobile device 102) determines that all other devices (e.g., mobile sensory device 114-1, mobile sensory device 114-2) of a particular tethered segment (e.g., tethered segment 118-1) are within a predefined area of the mobile device (e.g., mobile device 102), and therefore, within substantial physical proximity with respect to all other devices, the process may end.

Similarly at stage 922 (illustrated as "Yes") and with respect to an ARED and for each tethered segment, when the proximity component (e.g., proximity component 420) of the ARED (e.g., ARED 106) determines that all devices (e.g., mobile device 102, mobile sensory device 114-1, and mobile sensory device 114-2) of a particular tethered segment (e.g., tethered segment 118-1) are within predefined area of the ARED (e.g., ARED 106) and therefore, within substantial physical proximity with respect to each other, the process may end.

It is to be appreciated that the determinations by the proximity components discussed above may indicate that all devices (e.g., mobile device 102, mobile sensory device 114-1, mobile sensory device 114-2) of a tethered segment (e.g., tethered segment 118-1) associated with a user are either within physical proximity of the designated lead mobile device (e.g., mobile device 102) or the ARED (e.g., ARED 106). Thus, no alert notifications should be given at this time and the process may end.

Alternatively at stage 922 (illustrated as "No") and with respect to a designated lead mobile device (e.g., mobile device 102), when the proximity component (e.g., proximity component 220) of the designated lead mobile device (e.g., mobile device 102) determines that at least one other device (e.g., mobile sensory device 114-2) is not within the predefined area of the designated lead mobile device (e.g., mobile device 102), then the process may proceed to stage 924.

Similarly at stage 922 (illustrated as "No") and with respect to an ARED and for each tethered segment, when the proximity component (e.g., proximity component 420) of the ARED (e.g., ARED 106) determines that: (1) at least one device (e.g., mobile sensory device 114-2) of a particular tethered segment (e.g., tethered segment 118-1) is not within the predefined area of the ARED (e.g., ARED 106); and (2) at least one other device (e.g., mobile device 102) of the same particular tethered segment is within the predefined area of the ARED (e.g., ARED 106), then the process may also proceed to stage 924.

It is to be appreciated that the determinations by the proximity component 220 of the designated lead mobile device at stage 922 (illustrated as "No"), may indicate that at least one device (e.g., mobile sensory device 114-2) of a tethered segment (e.g., tethered segment 118-1) associated with a user is not within the physical proximity of the designated lead mobile device (e.g., mobile device 102). Similarly, the determinations by the proximity component 420 of the ARED at stage 922 (illustrated as "No") may indicate that at least one device (e.g., mobile sensory device 114-2) of a tethered segment is not within the physical proximity of the ARED while at least one other device (e.g., mobile device 102) is within the physical proximity of the ARED. Thus, these determinations may indicate that a user has forgotten or left behind a utility object and an alert notification should be provided.

At stage 924, the management component (e.g., management component 214 and/or 414) of the designated lead mobile device (e.g., mobile device 102) or the ARED (e.g., ARED 106) may transmit an alert notification to at least one other device (e.g., mobile sensory device 114-2) within the tethered segment (e.g., tethered segment 118-1) to provide at least one feedback to the user.

Additionally in some implementations, the transmission of the alert notification from a designated lead mobile device to the at least one other device may be periodic (e.g., every one (1) second, every two (2) seconds, etc.) and/or continuous (e.g., continuously transmit for five (5) minutes for every two (2) seconds, etc.) to ensure that the at least one other device, which may be out of communications range, receives at least one alert notification as soon as the designated lead mobile device moves within communication range. It is to be appreciated that by transmitting the alert notification to that at least one other device that is not within physical proximity and out of communication range of the designated lead mobile device, the user may easily locate the at least one other device that is not within the user's physical possession.

At stage 926, the feedback component (e.g., feedback component 218 and/or 418) of the designated lead mobile device (e.g., mobile device 102) or the ARED (e.g., ARED 106) may activate at least one feedback to provide at least one feedback to the user. The at least one feedback may further indicate to the user regarding a particular device (e.g., mobile sensory device 114-2) of a tethered segment (e.g., tethered segment 118-1) that was determined to be not within the physical proximity of the designated lead mobile device (e.g., mobile device 102) or the ARED (e.g., ARED 106).

FIG. 9C illustrates example active tracking operations that may be performed by a designated lead mobile device or an ARED to receive and update device activity information received from a follower device. In some implementations, a designated lead mobile device or an ARED may perform the stages of FIG. 9C substantially in parallel or simultaneously with respect to some or all stages further disclosed with respect to FIGS. 9A, 9B, 9D, and 9E.

At stage 930, a management component (e.g., management component 214 and/or 414) of a designated lead mobile device (e.g., mobile device 102) or an ARED (e.g., ARED 106) may be may receive device activity information via a local area network from at least one follower mobile device or mobile sensory device (e.g., mobile sensory device 114-1, 114-2, etc.), wherein the device activity information includes at least a device identifier (e.g., device identifier "Device_ID_2" that identifies mobile sensory device 114-1, etc.), motion state(s), motion direction(s), and update time stamp(s) for the device that transmitted the device activity information.

At stage 932, the management component (e.g., management component 214 and/or 414) of the designated lead mobile device (e.g., mobile device 102) or the ARED (ARED 106), may update device activity information stored in the device datastore (e.g., device datastore 250 and/or 450) based on the device activity information received from the least one mobile device and/or mobile sensory device.

It is to be appreciated that by repeatedly performing the operations in at least FIGS. 9A-9C and FIGS. 8A-8C in real-time or substantially near real-time in cooperation with each other as discussed, the mobile sensory system 100 may at least quickly determine whether any devices within a particular tethered segment may be inside or outside the limited geographical area surrounding a designated lead mobile device or ARED.

Figure 9D:
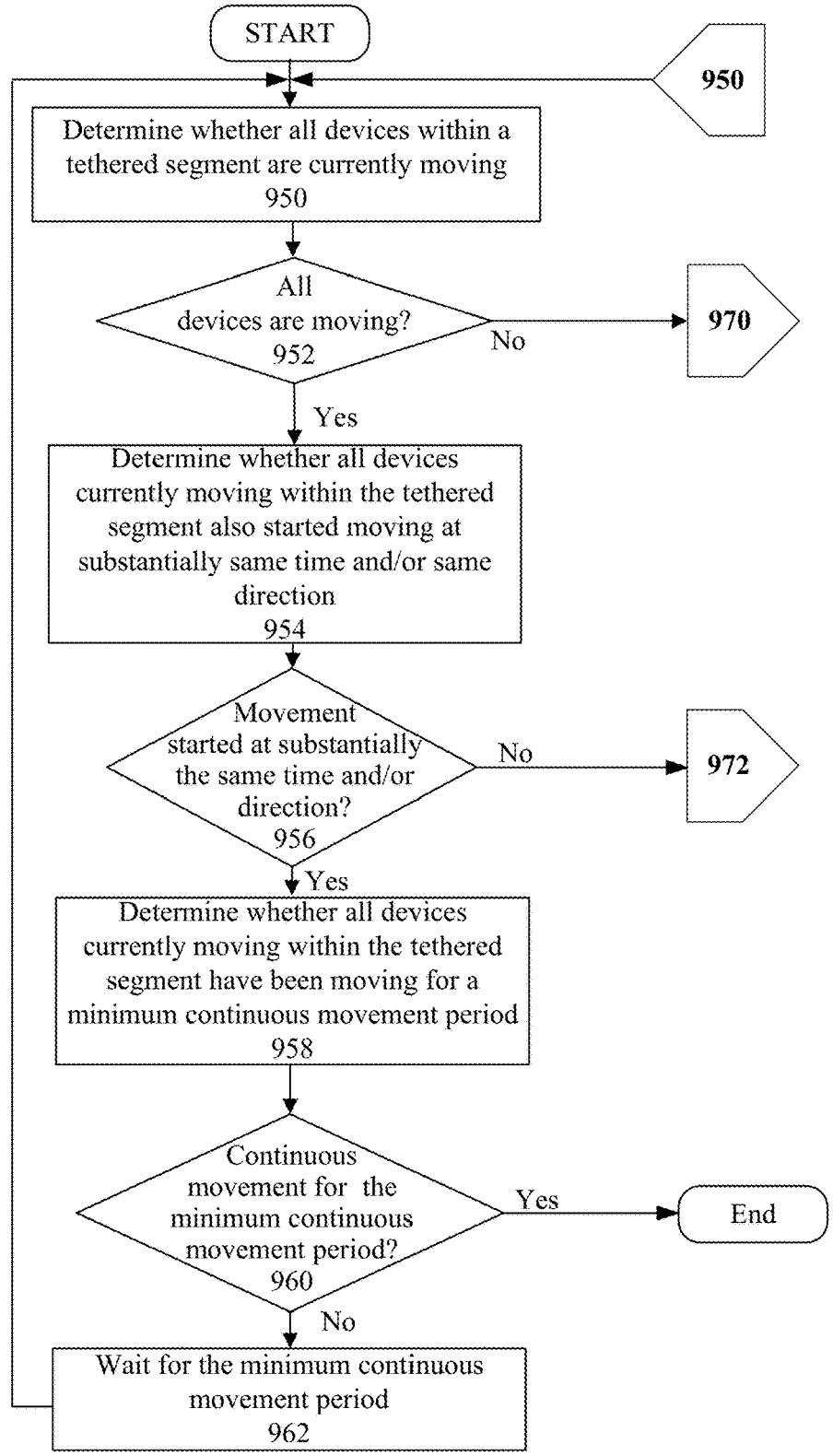

FIG. 9D illustrates example active tracking operations that may be performed by a designated lead mobile device or an ARED to predict whether all devices of a tether segment that is moving will remain within or leave physical proximity of each other.

At stage 950, a proximity component (e.g., proximity component 220 and/or 420) of a designated lead mobile device (e.g., mobile device 102) and/or ARED (e.g., ARED 106) may determine whether all devices within a tethered segment (e.g., tethered segment 118-1) associated with a user are currently moving. At stage 952 (illustrated as "Yes"), when the proximity component determines that all devices (e.g., mobile device 102, mobile sensory device 114-1, mobile sensory device 114-2) within a tethered segment (e.g., tethered segment 118-1) are moving, then the process may proceed to stage 954. Alternatively at stage 952 (illustrated as "No"), when the proximity component determines that at least one device (e.g., mobile sensory device 1104), within the tethered segment (e.g., tethered segment 118-1) is not moving, then the process may proceed to stage 970 of FIG. 9E.

At stage 954, the proximity component (e.g., proximity component 220 and/or 420) of the designated lead mobile device (e.g., mobile device 102) and/or the ARED (e.g., ARED 106) may determine whether all devices currently moving within the tethered segment also started moving at substantially same time and/or substantially same direction. For example, the proximity component may determine that all devices started moving at substantially the same time when the maximum time difference between a first device to transition from a non-moving state to a moving state (i.e., started moving) and a last device to transition from a non-moving state to a moving state (i.e., started moving) does not exceed a specific period of time (e.g., 500 milliseconds, one (1) second, etc.). Additionally, the proximity component may determine that all devices started moving at substantially same direction when the motion directions of all devices are substantially equal (e.g., all devices are moving West, etc.)

At stage 956 (illustrated as "Yes"), when proximity component (e.g., proximity component 220 and/or 420) of the designated lead mobile device (e.g., mobile device 102) and/or the ARED (e.g., ARED 106) determines that all devices started moving at substantially same time and/or same direction within the tethered segment (e.g., tethered segment 118-1), then the process may proceed to stage 958. Alternatively at stage 956 (illustrated as "No"), when the proximity component determines that at least one device (e.g., mobile sensory device 1104), within the tethered segment (e.g., tethered segment 118-1) is not moving at substantially same time or same direction within the tethered segment (e.g., tethered segment 118-1), then the process may proceed to stage 972 of FIG. 9E.

At stage 958, the proximity component (e.g., proximity component 220 and/or 420) of the designated lead mobile device (e.g., mobile device 102) and/or the ARED (e.g., ARED 106) may determine whether all devices currently moving within the tethered segment have been moving for a minimum continuous movement period. For example and for each device (e.g., mobile device 102, mobile sensory device 114-1, mobile sensory device 114-2) of a tethered segment (e.g., tethered segment 118-1), the proximity component may determine whether each device has been moving for a minimum continuous movement period. Continuing with the example, the proximity component may determine that a device has been moving for a minimum continuous movement period, when the device that is currently moving within the tethered segment has remained or persisted in the moving state for the minimum continuous movement period (e.g., two (2) seconds, three (3) seconds, etc.).

At stage 960 (illustrated as "No"), when proximity component (e.g., proximity component 220 and/or 420) of the designated lead mobile device (e.g., mobile device 102) and/or the ARED (e.g., ARED 106) determines that at least one device has not been moving for a minimum continuous movement period, then the process may proceed to stage 962. Alternatively at stage 960 (illustrated as "Yes"), when the proximity component determines that all devices (e.g., mobile device 102, mobile sensory device 114-1, mobile sensory device 114-2) within the tethered segment (e.g., tethered segment 118-1) has been moving together for a minimum continuous movement period then the process may end, which may indicate that the user associated with the tethered segment has possession of utility objects and devices he is keeping track of because all objects and devices are moving together with the user.

At stage 962, the proximity component (e.g., proximity component 220 and/or 420) of the designated lead mobile device (e.g., mobile device 102) and/or the ARED (e.g., ARED 106) may wait for the minimum continuous movement period before proceeding back to stage 950.

Figure 9E:
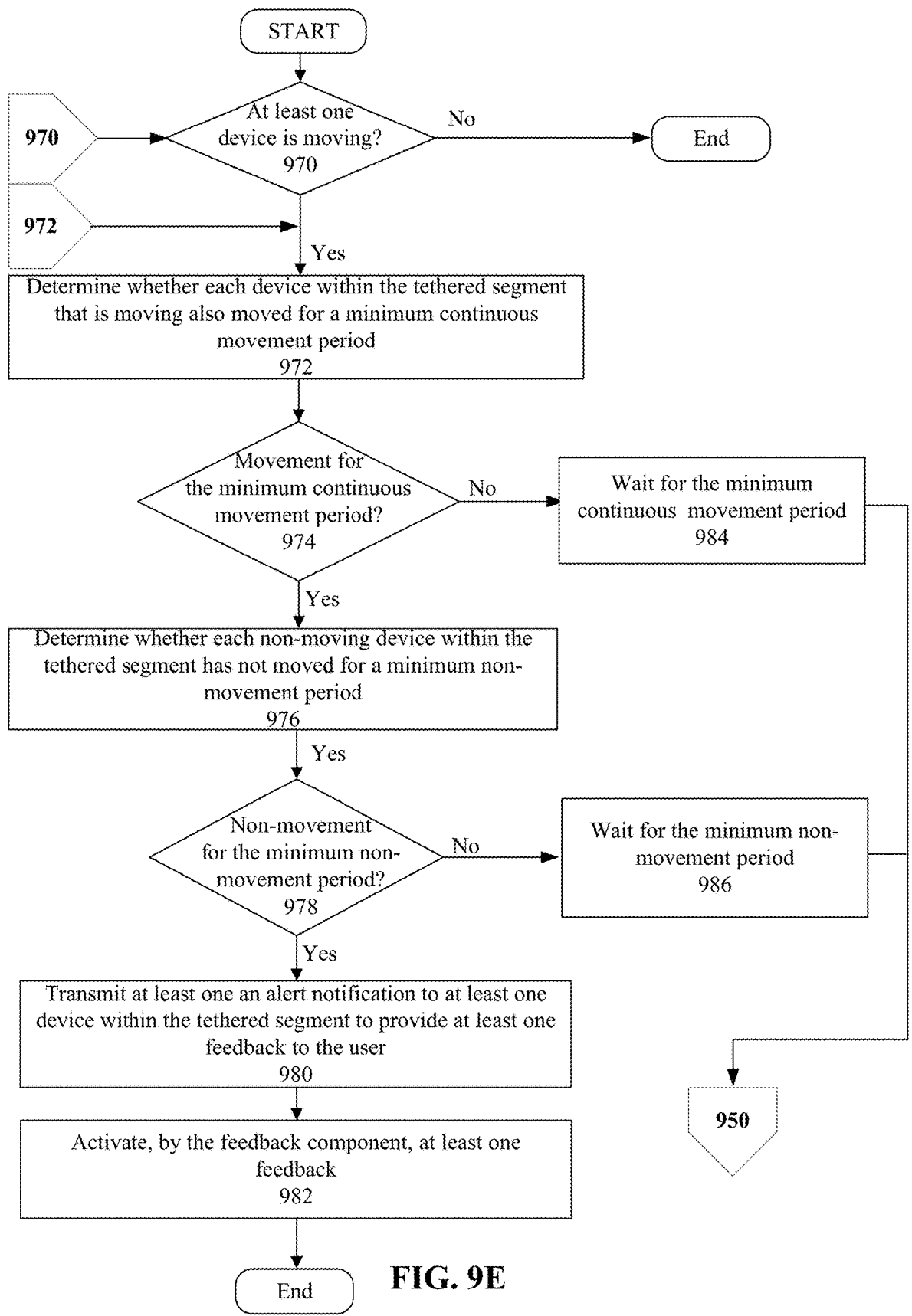

FIG. 9E illustrates additional example active tracking operations that may be performed by a designated lead mobile device or an ARED to predict whether a mobile device or a mobile sensory device of a tethered segment that is moving will remain within or leave physical proximity of each other.

At stage 970 (illustrated as "Yes") and after performing stage 952 at FIG. 9D, the proximity component (e.g., proximity component 220 and/or 420) of the designated lead mobile device (e.g., mobile device 102) and/or the ARED (e.g., ARED 106) may proceed to stage 972, when the proximity component determines that at least one device is moving, i.e., in a motion state. Alternatively at stage 972 (illustrated as "No"), the process may end which may indicate that there are no devices within the tethered segment that are currently moving, i.e., all devices within the tethered segment have remained stationary, i.e., in a not moving state.

At stage 972, the proximity component (e.g., proximity component 220 and/or 420) of the designated lead mobile device (e.g., mobile device 102) and/or the ARED (e.g., ARED 106) may determine whether each device within the tethered segment that is moving also moved for a minimum continuous movement period. For example and for each device (e.g., mobile device 102, mobile sensory device 114-1, mobile sensory device 114-2) within the tethered segment (e.g., tethered segment 118-1) that is currently moving, the proximity component may determine whether each device has been moving for a minimum continuous movement period.

At stage 974 (illustrated as "Yes"), when the proximity component (e.g., proximity component 220 and/or 420) of the designated lead mobile device (e.g., mobile device 102) and/or the ARED (e.g., ARED 106) determines that all the devices that are currently moving have been for a minimum continuous movement period, then the process may proceed to stage 976. Alternatively at stage 974 (illustrated as "No"), the process may proceed to stage 984, where the proximity component (e.g., proximity component 220 and/or 420) of the designated lead mobile device (e.g., mobile device 102 may wait for the minimum continuous movement period before proceeding back to stage 950 of FIG. 9D.

At stage 976, the proximity component (e.g., proximity component 220 and/or 420) of the designated lead mobile device (e.g., mobile device 102) and/or the ARED (e.g., ARED 106) may determine whether each non-moving device within the tethered segment has not moved for a minimum non-movement period. For example and for each device (e.g., mobile device 102, mobile sensory device 114-1, mobile sensory device 114-2) within the tethered segment (e.g., tethered segment 118-1) that is not currently moving, the proximity component may determine whether each device has not been moving for a minimum continuous non-movement period. Continuing with the example, the proximity component may determine that a device has not been moving for a minimum continuous non-movement period, when the device that is currently not moving, i.e., stationary within the tethered segment has remained or persisted in the not moving state for the minimum continuous non-movement period (e.g., two (2) seconds, three (3) seconds, etc.).

At stage 978 (illustrated as "Yes"), when the proximity component (e.g., proximity component 220 and/or 420) of the designated lead mobile device (e.g., mobile device 102) and/or the ARED (e.g., ARED 106) determines that all the devices that are currently not moving have remained stationary for a minimum continuous non-movement period, then the process may proceed to stage 980. Alternatively, at stage 978 (illustrated as "No"), the process may proceed to stage 986, where the proximity component of the designated lead mobile device (e.g., mobile device 102) and/or the ARED (e.g., ARED 106) may wait for the minimum continuous non-movement period before proceeding back to stage 950 of FIG. 9D.

It is to be appreciated that by waiting for the minimum continuous movement period at one or more stages (e.g., stages 962 and 984), the proximity component may reduce potential false positives that may occur when a device (e.g., mobile device 102, mobile sensory device 114-1, etc.) within the tethered segment (e.g., tethered segment 118-1) begins to move merely because the user has picked up the device (e.g., mobile device 102) for a nominal period of time for purposes of examination, manipulation, or minor relocation.

Similarly, by waiting for a minimum continuous non-movement period at least one stage (e.g., stage 986), the proximity component may reduce potential false positives that may occur when a device (e.g., mobile device 102, mobile sensory device 114-1, etc.) within the tethered segment (e.g., tethered segment 118-1) is momentarily put down by the user and thus remains stationary for a nominal period of time but is then picked back up again for further relocation.

Additionally, it is to be appreciated that such wait periods (e.g., minimum continuous movement period at stages 962 and 984 and minimum continuous non-movement period stage 986) may also reduce potential false positives that may arise due to nominal variances and/or inaccuracies in motion detection by the activity component 216 and activity component 316 via various components of the mobile device and/or mobile sensory device.

At stage 980, the management component (e.g., management component 214 and/or 414) of the designated lead mobile device (e.g., mobile device 102) or ARED (e.g., ARED 106) may generally transmit an alert notification to at least one device (e.g., mobile sensory device 114-2) within the tethered segment (e.g., tethered segment 118-1) to provide at least one feedback to the user indicating that the at least one device is predicted to not remain within physical proximity of the designated lead mobile device or ARED.

Additionally at stage 980, in instances when the ARED is performing the processes discussed in FIGS. 9D and 9E, the management component of the ARED may transmit the alert notification to at least the designated lead mobile device. Furthermore and at stage 980, in instances when the designed lead mobile device is performing active tracking operations discussed in FIGS. 9D and 9E, the management component of the designed lead mobile device may optionally transmit the alert notification to at least one device that has a motion state opposite of the designed lead mobile device. For example, if the designated lead mobile device within the tether segment is currently in a moving state, then the designated lead mobile device may transmit an alert notification to any devices that is not in a moving state within the same tethered segment and vice versa.

At stage 982, the feedback component (e.g., feedback component 218 and/or 418) of a designated lead mobile device (e.g., mobile device 102) and/or ARED (e.g., ARED 106) may activate at least one feedback to provide at least one feedback to the user indicating that at least one device within the tethered segment (e.g., tethered segment 118-1) that is predicted to not remain within the physical proximity of the designated lead mobile device or ARED. The at least one feedback may further indicate to the user regarding which particular device (e.g., mobile sensory device 114-2) within the tethered segment (e.g., tethered segment 118-1) that is predicted to not remain within the physical proximity of the designated lead mobile device (e.g., mobile device 102) or ARED (e.g., ARED 106).

It is to be appreciated that by repeatedly performing the operations in at least FIGS. 8A-8C and FIGS. 9C-9E in real-time or substantially near real-time in cooperation with each other as discussed, the mobile sensory system 100 may quickly predict whether any devices within a particular tethered segment may remain within the limited geographical area surrounding a designated lead mobile device or ARED.

It is to be further appreciated that while some of the above example embodiments illustrated in FIGS. 1-4, 5A-5C, 6A-6B, 7A-7B, 8A-8C and 9A-9E may have been described in substantial detail with respect to mobile device 102, ARED 106, and mobile sensory devices 114-1 and 114-2, the example embodiments are not limited to those contexts and/or devices.

Example Computer System

Various embodiments and components therein can be implemented, for example, using one or more well-known computer systems, such as, for example, the example embodiments, systems, and/or devices (e.g., mail servers, SMS servers, etc.) shown in the figures or otherwise discussed. Computer system 1000 can be any well-known computer capable of performing the functions described herein.

Computer system 1000 includes one or more processors (also called central processing units, or CPUs), such as a processor 1004. Processor 1004 is connected to a communication infrastructure or bus 1006.

One or more processors 1004 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 also includes user input/output device(s) 1003, such as monitors, keyboards, pointing devices, etc., that communicate with communication infrastructure 1006 through user input/output interface(s) 1002.

Computer system 1000 also includes a main or primary memory 1008, such as random access memory (RAM). Main memory 1008 may include one or more levels of cache. Main memory 1008 has stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 includes a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 reads from and/or writes to removable storage unit 1018 in a well-known manner.

According to an exemplary embodiment, secondary memory 1010 may include other means, instrumentalities or other approaches for allowing computer programs and/or other instructions and/or data to be accessed by computer system 1000. Such means, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 enables computer system 1000 to communicate and interact with any combination of remote devices, remote networks, remote entities, etc. (individually and collectively referenced by reference number 1028). For example, communication interface 1024 may allow computer system 1000 to communicate with remote devices 1028 over communications path 1026, which may be wired and/or wireless, and which may include any combination of LANs, WANs, the Internet, etc. Control logic and/or data may be transmitted to and from computer system 1000 via communications path 1026.

In an embodiment, a non-transitory, tangible apparatus or article of manufacture comprising a non-transitory, tangible computer useable or readable medium having control logic (software) stored thereon is also referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000), causes such data processing devices to operate as described herein.

Figure 10:
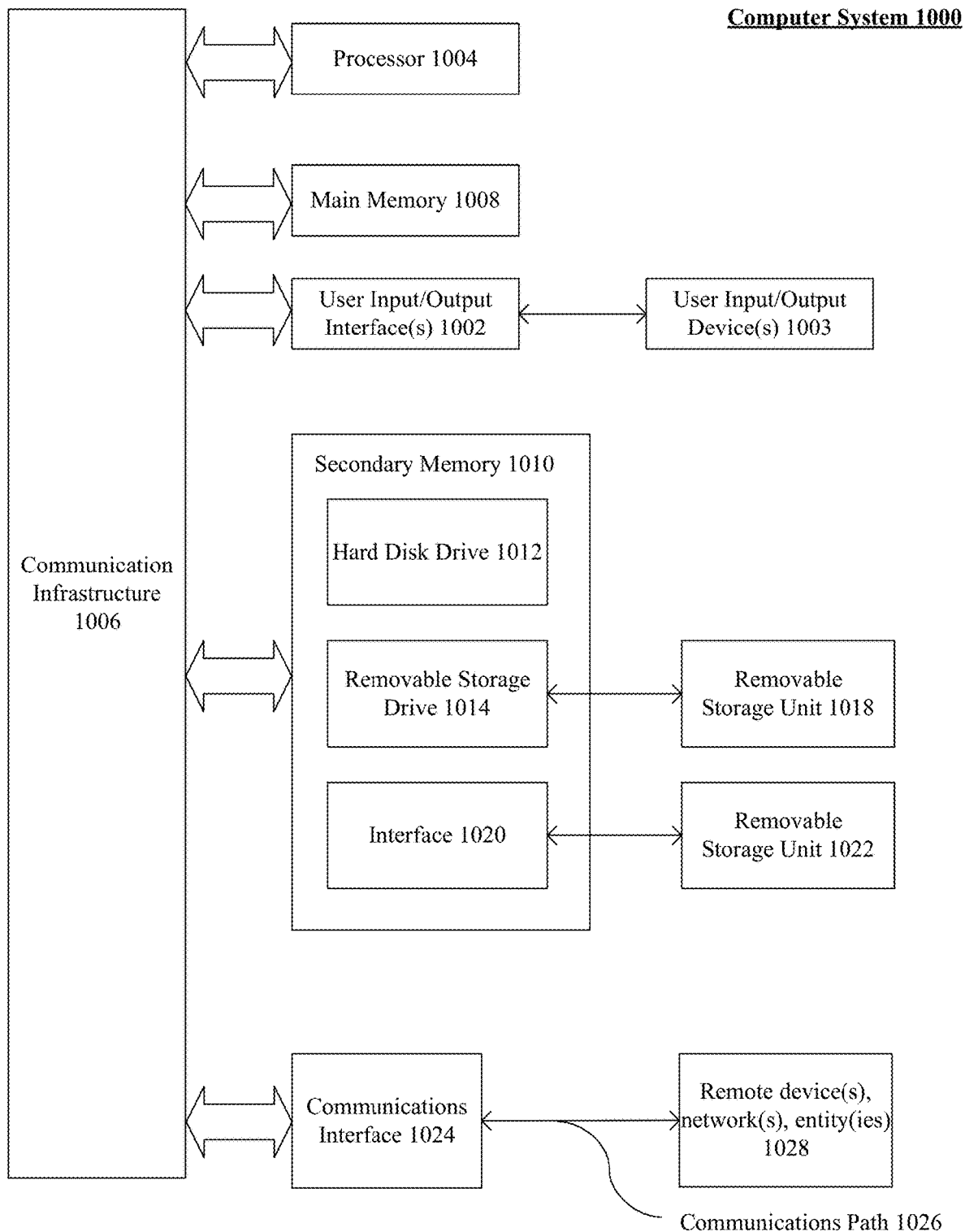
FIG. 10 is an example computer system useful for implementing various embodiments of this disclosure.

Based on the teachings contained in this disclosure, it will be apparent to persons skilled in the relevant art(s) how to make and use embodiments of this disclosure using data processing devices, computer systems and/or computer architectures other than that shown in FIG. 10. In particular, embodiments may operate with software, hardware, and/or operating system implementations other than those described herein.

CONCLUSION

It is to be appreciated that the Detailed Description section, and not the Summary and Abstract sections, is intended to be used to interpret the claims. The Summary and Abstract sections can set forth one or more but not all exemplary embodiments as contemplated by the inventor, and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A lead device, comprising:
   at least one processor; and
   a memory operatively coupled to the at least one processor, the at least one processor configured to:
      determine that the lead device is leaving or entering a predefined area;
      determine that at least one mobile sensory device of a predefined set of devices within a tethered segment associated with the lead device is inside the predefined area of the lead device, wherein the at least one mobile sensory device is configured to communicate with the lead device; and
      in response to a determination that the at least one mobile sensory device is inside the predefined area, cause the lead device to switch between performing a first type of tracking operations and a second type of tracking operations based on whether the lead device is entering or leaving the predefined area.

2. The lead device of claim 1, wherein the predefined area is associated with an audio responsive electronic device (ARED) configured to communicate with the lead device.

3. The lead device of claim 2, wherein, to determine that the lead device is leaving the predefined area, the at least one processor is configured to:
   determine that the lead device is unable to communicate with the ARED; and
   determine that the lead device is leaving the predefined area in response to a determination that the lead device is unable to communicate with the ARED.

4. The lead device of claim 2, wherein, to determine that the lead device is entering the predefined area, the at least one processor is configured to:
   determine that the lead device is able to communicate with the ARED; and
   determine that the lead device is entering the predefined area in response to a determination that the lead device is able to communicate with the ARED.

5. The lead device of claim 1, wherein the first type of tracking operations are passive tracking operations, and wherein, to cause the lead device to switch between performing the first type of tracking operations and the second type of tracking operations, the at least one processor is configured to:
   determine that the lead device is entering the predefined area; and
   cause the lead device to switch to performing the passive tracking operations in response to a determination that the lead device is entering the predefined area.

6. The lead device of claim 1, wherein the second type of tracking operations are active tracking operations, and wherein, to cause the lead device to switch between to performing the first type of tracking operations and the second type of tracking operations, the at least one processor is configured to:
   determine that the lead device is leaving the predefined area; and
   cause the lead device to switch to performing the active tracking operations in response to a determination that the lead device is leaving the predefined area.

7. The lead device of claim 6, wherein, to perform the active tracking operations, the at least one processor is configured to:
   receive device activity information from the at least one mobile sensory device, wherein the device activity information comprises at least one of:
      a device identifier of the at least one mobile sensory device;
      a motion state of the at least one mobile sensory device;
      a motion direction of the at least one mobile sensory device; or
      a time stamp indicative of a time at which the device activity information was transmitted by the at least one mobile sensory device; and
   update a device database based on the device activity information.

8. A computer-implemented method, comprising:
   determining, by at least one computer processor, that a lead device is leaving or entering a predefined area;
   determining that at least one mobile sensory device of a predefined set of devices within a tethered segment associated with the lead device is inside the predefined area of the lead device, wherein the at least one mobile sensory device is configured to communicate with the lead device; and
   in response to determining that the at least one mobile sensory device is inside the predefined area, causing the lead device to switch between performing a first type of tracking operations and a second type of tracking operations based on whether the lead device is entering or leaving the predefined area.

9. The computer-implemented method of claim 8, wherein the predefined area is associated with an audio responsive electronic device (ARED) configured to communicate with the lead device.

10. The computer-implemented method of claim 9, wherein determining that the lead device is leaving the predefined area comprises:
    determining that the lead device is unable to communicate with the ARED; and
    determining that the lead device is leaving the predefined area in response to determining that the lead device is unable to communicate with the ARED.

11. The computer-implemented method of claim 9, wherein determining that the lead device is entering the predefined area comprises:
    determining that the lead device is able to communicate with the ARED; and
    determining that the lead device is entering the predefined area in response to determining that the lead device is able to communicate with the ARED.

12. The computer-implemented method of claim 8, wherein the first type of tracking operations are passive tracking operations, and wherein causing the lead device to switch between performing the first type of tracking operations and the second type of tracking operations comprises:
    determining that the lead device is entering the predefined area; and
    causing the lead device to transition to performing the passive tracking operations in response to determining that the lead device is entering the predefined area.

13. The computer-implemented method of claim 8, wherein the second type of tracking operations are active tracking operations, and wherein causing the lead device to switch between performing the first type of tracking operations and the second type of tracking operations comprises:
- determining that the lead device is leaving the predefined area; and
- causing the lead device to transition to performing the active tracking operations in response to determining that the lead device is leaving the predefined area.

14. The computer-implemented method of claim 13, wherein the active tracking operations comprise:
- receiving device activity information from the at least one mobile sensory device, wherein the device activity information comprises at least one of:
  - a device identifier of the at least one mobile sensory device;
  - a motion state of the at least one mobile sensory device;
  - a motion direction of the at least one mobile sensory device; or
  - a time stamp indicative of a time at which the device activity information was transmitted by the at least one mobile sensory device; and
- updating a device database based on the device activity information.

15. A non-transitory computer-readable medium having instructions stored thereon that, when executed by a computing device, cause the computing device to perform operations comprising:
- determining that a lead device is leaving or entering a predefined area;
- determining that at least one mobile sensory device of a predefined set of devices within a tethered segment associated with the lead device is inside the predefined area of the lead device, wherein the at least one mobile sensory device is configured to communicate with the lead device; and
- in response to determining that the at least one mobile sensory device is inside the predefined area, causing the lead device to switch between performing a first type of tracking operations and a second type of tracking operations based on whether the lead device is entering or leaving the predefined area.

16. The non-transitory computer-readable medium of claim 15, wherein the predefined area is associated with an audio responsive electronic device (ARED) configured to communicate with the lead device.

17. The non-transitory computer-readable medium of claim 16, wherein determining that the lead device is leaving the predefined area comprises:
- determining that the lead device is unable to communicate with the ARED; and
- determining that the lead device is leaving the predefined area in response to determining that the lead device is unable to communicate with the ARED.

18. The non-transitory computer-readable medium of claim 16, wherein determining that the lead device is entering the predefined area comprises:
- determining that the lead device is able to communicate with the ARED; and
- determining that the lead device is entering the predefined area in response to determining that the lead device is able to communicate with the ARED.

19. The non-transitory computer-readable medium of claim 15, wherein the first type of tracking operations are passive tracking operations, and wherein causing the lead device to switch between performing the first type of tracking operations and the second type of tracking operations comprises:
- determining that the lead device is entering the predefined area; and
- causing the lead device to transition to performing the passive tracking operations in response to determining that the lead device is entering the predefined area.

20. The non-transitory computer-readable medium of claim 15, wherein the second type of tracking operations are active tracking operations, and wherein causing the lead device to switch between to performing the first type of tracking operations and the second type of tracking operations comprises:
- determining that the lead device is leaving the predefined area; and
- causing the lead device to transition to performing the active tracking operations in response to determining that the lead device is leaving the predefined area.

* * * * *